(12) United States Patent
Fujiwara et al.

(10) Patent No.: US 10,711,808 B2
(45) Date of Patent: *Jul. 14, 2020

(54) BAR-END TYPE BICYCLE HYDRAULIC OPERATING DEVICE

(71) Applicant: Shimano Inc., Sakai, Osaka (JP)

(72) Inventors: Takaaki Fujiwara, Osaka (JP); Kazutaka Fukao, Osaka (JP)

(73) Assignee: Shimano Inc., Osaka (JP)

( * ) Notice: Subject to any disclaimer, the term of this patent is extended or adjusted under 35 U.S.C. 154(b) by 112 days.

This patent is subject to a terminal disclaimer.

(21) Appl. No.: 14/707,032

(22) Filed: May 8, 2015

(65) Prior Publication Data

US 2016/0327067 A1 Nov. 10, 2016

(51) Int. Cl.
  *B62K 23/06* (2006.01)
  *F15B 7/08* (2006.01)
  *B62L 3/02* (2006.01)
  *B62K 21/26* (2006.01)

(52) U.S. Cl.
  CPC ............. *F15B 7/08* (2013.01); *B62K 21/26* (2013.01); *B62K 23/06* (2013.01); *B62L 3/023* (2013.01)

(58) Field of Classification Search
  CPC ........ B62K 23/02; B62K 21/16; B62K 21/26; B62K 23/06; B62M 25/04; F15B 7/08; B60T 11/165; B60T 11/18; B60T 7/102; B60T 11/20; B62L 3/023
  See application file for complete search history.

(56) References Cited

U.S. PATENT DOCUMENTS

| | | | |
|---|---|---|---|
| 2,271,273 A * | 1/1942 | Mueller | B62L 3/023 188/24.11 |
| 4,665,803 A | 5/1987 | Mathauser | |
| 4,921,081 A | 5/1990 | Chilcote | |
| 5,241,878 A | 9/1993 | Nagano | |
| 5,400,675 A | 3/1995 | Nagano | |
| 6,073,730 A | 6/2000 | Abe | |
| 7,062,989 B2 | 6/2006 | Tsumiyama | |
| 7,124,873 B2 | 10/2006 | Tsumiyama | |
| 7,530,435 B2 * | 5/2009 | Lumpkin | B60T 7/102 188/344 |

(Continued)

FOREIGN PATENT DOCUMENTS

| | | | |
|---|---|---|---|
| DE | 202011000141 U1 * | 4/2011 | |
| DE | 102012109965 A1 * | 4/2014 | |

(Continued)

OTHER PUBLICATIONS

Define type—Google Search, google.com., Oct. 25, 2017.*

(Continued)

*Primary Examiner* — Vinh Luong
(74) *Attorney, Agent, or Firm* — Global IP Counselors, LLP

(57) ABSTRACT

A bar-end type bicycle hydraulic operating device is basically provided with a base member and a hydraulic unit. The base member is configured to be mounted on a handlebar. The base member has an abutment that is configured to contact an end of the handlebar. The hydraulic unit is provided on the base member. The hydraulic unit includes a hydraulic cylinder that has a cylinder bore, a piston movably disposed in the cylinder bore, and a reservoir fluidly communicating with the cylinder bore.

19 Claims, 24 Drawing Sheets

(56) References Cited

U.S. PATENT DOCUMENTS

| | | | |
|---|---|---|---|
| 8,201,670 B2 | 6/2012 | Tetsuka et al. | |
| 8,464,844 B2 | 6/2013 | Jordan | |
| 9,896,150 B2 * | 2/2018 | Fujiwara | B62K 23/06 |
| 10,144,484 B2 * | 12/2018 | Kariyama | B62K 23/06 |
| 10,513,308 B2 * | 12/2019 | Jordan | B62L 3/02 |
| 2007/0068314 A1 | 3/2007 | Miki | |
| 2008/0168856 A1 * | 7/2008 | Tetsuka | B62K 23/06 |
| | | | 74/502.2 |
| 2008/0196537 A1 | 8/2008 | Dal Pra' | |
| 2010/0083788 A1 | 4/2010 | Jordan et al. | |
| 2010/0199798 A1 | 8/2010 | Uno | |
| 2011/0011197 A1 | 1/2011 | Oku et al. | |
| 2011/0031078 A1 * | 2/2011 | Matsushita | B60T 7/102 |
| | | | 188/344 |
| 2011/0240426 A1 * | 10/2011 | Hirose | B60T 7/102 |
| | | | 188/344 |
| 2012/0240715 A1 | 9/2012 | Tsai | |
| 2013/0174543 A1 * | 7/2013 | Nago | B62L 3/023 |
| | | | 60/562 |
| 2013/0180815 A1 | 7/2013 | Dunlap et al. | |
| 2013/0255239 A1 | 10/2013 | Miki | |
| 2014/0041379 A1 * | 2/2014 | Ruckh | B62L 3/023 |
| | | | 60/594 |
| 2014/0174866 A1 * | 6/2014 | Matsushita | B62L 3/023 |
| | | | 188/344 |
| 2015/0266540 A1 * | 9/2015 | Snead | B62K 23/06 |
| | | | 188/344 |
| 2015/0291247 A1 * | 10/2015 | Fukao | B62L 3/023 |
| | | | 74/473.14 |
| 2016/0090150 A1 * | 3/2016 | Kobayashi | B62L 3/023 |
| | | | 60/533 |
| 2016/0327070 A1 * | 11/2016 | Fujiwara | B62K 23/00 |
| 2017/0240244 A1 * | 8/2017 | Kariyama | B62L 3/023 |
| 2018/0099724 A1 * | 4/2018 | Nakai | B62K 23/06 |
| 2018/0141612 A1 * | 5/2018 | Hara | B62K 23/06 |
| 2018/0208266 A1 * | 7/2018 | Komada | B62K 23/06 |
| 2018/0238354 A1 * | 8/2018 | Komada | B62K 23/06 |

FOREIGN PATENT DOCUMENTS

| | | | | |
|---|---|---|---|---|
| DE | 102014210186 A1 | * | 12/2014 | |
| DE | 102015010839 A1 | * | 8/2015 | B62M 25/08 |
| FR | 2686659 | * | 7/1993 | |

OTHER PUBLICATIONS

Type/Definition of Type by Merriam-Webster, merriam-webster.com., Oct. 25, 2017.*
English Abstract of FR 2686659, Tobiasz, Jul. 30, 1993.*
Hydraulic brake—Wikipedia, the free encyclopedia, wikipedia.org., Sep. 25, 2016 (Year: 2016).*
Define hydraulic brake, Google Search, google.com., Jul. 9, 2018 (Year: 2018).*
Derwent Abstract of DE102015010839 A1, Fukao et al., Aug. 4, 2016. (Year: 2016).*

* cited by examiner

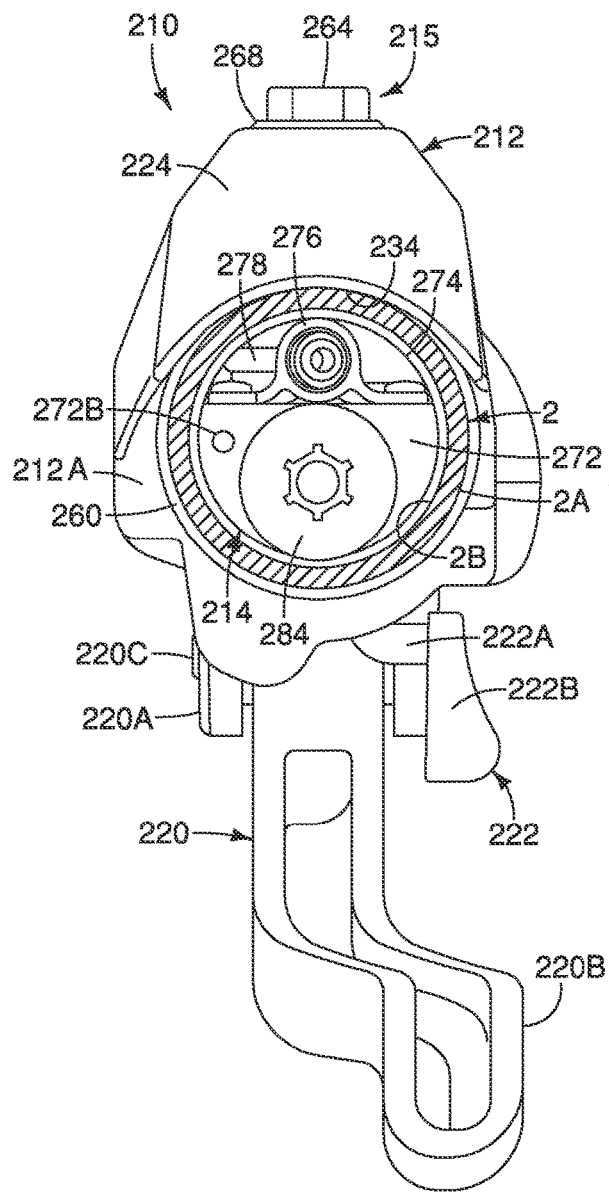

BAR-END TYPE BICYCLE HYDRAULIC OPERATING DEVICE

CROSS-REFERENCE TO RELATED APPLICATIONS

This application is a continuation-in-part application of U.S. patent application Ser. No. 14/468,196 filed on Aug. 25, 2014. The entire disclosure of U.S. patent application Ser. No. 14/468,196 is hereby incorporated herein by reference.

BACKGROUND

Field of the Invention

This invention generally relates to a bar-end type bicycle hydraulic operating device. More specifically, the present invention relates to a bar-end type bicycle hydraulic operating device having a hydraulic unit with a hydraulic cylinder and a reservoir fluidly communicating with a cylinder bore of the hydraulic cylinder.

Background Information

Typically, most bicycles are provided with handlebar mounted operating devices for operating various bicycle components of a bicycle. A bull horn handlebar curves forward away from the rider and allows the rider to ride in a tuck position. Typically, each end of the bull horn handlebar is provided with a "bar-end operating device" that has an attachment portion disposed inside the end of the bull horn handlebar. In some instances, these bar-end operating devices can include both a shift operating device and a brake operating device. One example of a bar-end operating device having an attachment portion that is disposed inside the end of the bull horn handlebar is disclosed in U.S. Patent Application Publication No. 2011/0011197.

More recently, bicycles have been provided with hydraulic systems for operating various bicycle components. The bicycle hydraulic system typically has a hydraulic operating device that is connected to one or more bicycle hydraulically actuated components via one or more hydraulic hoses. In the case of a bicycle hydraulic brake system, typically a brake lever is provided as a hydraulic operating device that is fluidly connected to a brake caliper (e.g., a hydraulic operated device) by a hydraulic hose.

SUMMARY

Generally, the present disclosure is directed to various features of a bar-end type bicycle hydraulic operating device. In one embodiment, a bar-end type bicycle hydraulic operating device is provided with a hydraulic unit having a hydraulic cylinder and a reservoir fluidly communicating with a cylinder bore of the hydraulic cylinder.

A hydraulic operating device that is provided with a fluid reservoir that is fluidly communicating with the cylinder bore of the hydraulic cylinder is known as an open type hydraulic operating device. On the other hand, a hydraulic operating device that does not have a fluid reservoir is known as a closed type hydraulic operating device.

In view of the state of the known technology and in accordance with a first aspect of the present disclosure, a bar-end type bicycle hydraulic operating device is provided that basically comprises a base member and a hydraulic unit. The base member is configured to be mounted on a handlebar. The base member has an abutment that is configured to contact an end of the handlebar. The hydraulic unit is provided on the base member. The hydraulic unit includes a hydraulic cylinder that has a cylinder bore, a piston movably disposed in the cylinder bore and a reservoir fluidly communicating with the cylinder bore.

In accordance with a second aspect of the present invention, the bar-end type bicycle hydraulic operating device according to the first aspect is configured so that the hydraulic cylinder is at least partially disposed inside the handlebar in the state where the base member is mounted to the handlebar.

In accordance with a third aspect of the present invention, the bar-end type bicycle hydraulic operating device according to the second aspect is configured so that the reservoir is disposed outside the handlebar in the state where the base member is mounted to the handlebar.

In accordance with a fourth aspect of the present invention, the bar-end type bicycle hydraulic operating device according to the third aspect is configured so that the base member includes an external handlebar fixing structure configured to contact an external surface of the handlebar.

In accordance with a fifth aspect of the present invention, the bar-end type bicycle hydraulic operating device according to the third aspect is configured so that the base member includes a fluid passage connecting the cylinder bore and the reservoir.

In accordance with a sixth aspect of the present invention, the bar-end type bicycle hydraulic operating device according to the fifth aspect is configured so that the base member has a recess provided between the cylinder bore and the reservoir, and a cover configured to cover the recess so as to define a space between the recess and the cover; and the fluid passage includes the space between the recess and the cover.

In accordance with a seventh aspect of the present invention, the bar-end type bicycle hydraulic operating device according to the fifth aspect is configured so that the fluid passage includes a first passage portion and a second passage portion, the second passage portion having a larger cross sectional dimension than the first passage portion in a direction transverse to a fluid flow direction between the cylinder bore and the reservoir.

In accordance with an eighth aspect of the present invention, the bar-end type bicycle hydraulic operating device according to the seventh aspect is configured so that the fluid passage further includes a third passage portion. The second passage portion has an opening. The second passage portion is disposed between the first and third passage portions. The base member has a cover configured to cover the opening of the second passage portion.

In accordance with a ninth aspect of the present invention, the bar-end type bicycle hydraulic operating device according to the fifth aspect is configured so that the fluid passage has a connecting portion contiguous with a port of the hydraulic cylinder, the connecting portion extending in a direction transverse to a fluid flow direction between the cylinder bore and the reservoir.

In accordance with a tenth aspect of the present invention, the bar-end type bicycle hydraulic operating device according to the second aspect is configured so that the reservoir is at least partially disposed inside the handlebar in the state where the base member is mounted to the handlebar.

In accordance with an eleventh aspect of the present invention, the bar-end type bicycle hydraulic operating device according to the tenth aspect is configured so that the base member includes an external handlebar fixing structure configured to contact an external surface of the handlebar In accordance with a twelfth aspect of the present invention, the bar-end type bicycle hydraulic operating device according to the first aspect is configured so that the hydraulic cylinder is disposed outside the handlebar in the state where the base member is mounted to the handlebar.

In accordance with a thirteenth aspect of the present invention, the bar-end type bicycle hydraulic operating device according to the twelfth aspect is configured so that the reservoir is disposed outside the handlebar in the state where the base member is mounted to the handlebar.

In accordance with a fourteenth aspect of the present invention, the bar-end type bicycle hydraulic operating device according to the twelfth aspect is configured so that the reservoir is at least partially disposed inside the handlebar in the state where the base member is mounted to the handlebar.

In accordance with a fifteenth aspect of the present invention, the bar-end type bicycle hydraulic operating device according to the first aspect further comprises an operating member configured to operate the hydraulic unit, and an additional unit provided on one of the base member and the operating member.

In accordance with a sixteenth aspect of the present invention, the bar-end type bicycle hydraulic operating device according to the fifteenth aspect is configured so that the additional unit is configured to operate a control cable.

In accordance with a seventeenth aspect of the present invention, the bar-end type bicycle hydraulic operating device according to the sixteenth aspect is configured so that the additional unit is mounted on the base member.

In accordance with an eighteenth aspect of the present invention, the bar-end type bicycle hydraulic operating device according to the fifteenth aspect is configured so that the additional unit includes an electric switch.

In accordance with a nineteenth aspect of the present invention, the bar-end type bicycle hydraulic operating device according to the eighteenth aspect is configured so that the electric switch is mounted on the operating member.

Also other objects, features, aspects and advantages of the disclosed bar-end type bicycle hydraulic operating device will become apparent to those skilled in the art from the following detailed description, which, taken in conjunction with the annexed drawings, discloses one embodiment of the bar-end type bicycle hydraulic operating device.

BRIEF DESCRIPTION OF THE DRAWINGS

Referring now to the attached drawings which form a part of this original disclosure:

FIG. 27 is a rear end elevational view of the right bicycle hydraulic operating device illustrated in FIGS. 19 to 26, with the right free end of the handlebar shown in cross section;

FIG. 28 is a rear end elevational view, similar to FIG. 27, of the right bicycle hydraulic operating device, but with a hydraulic hose connector and a cylinder plug removed;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
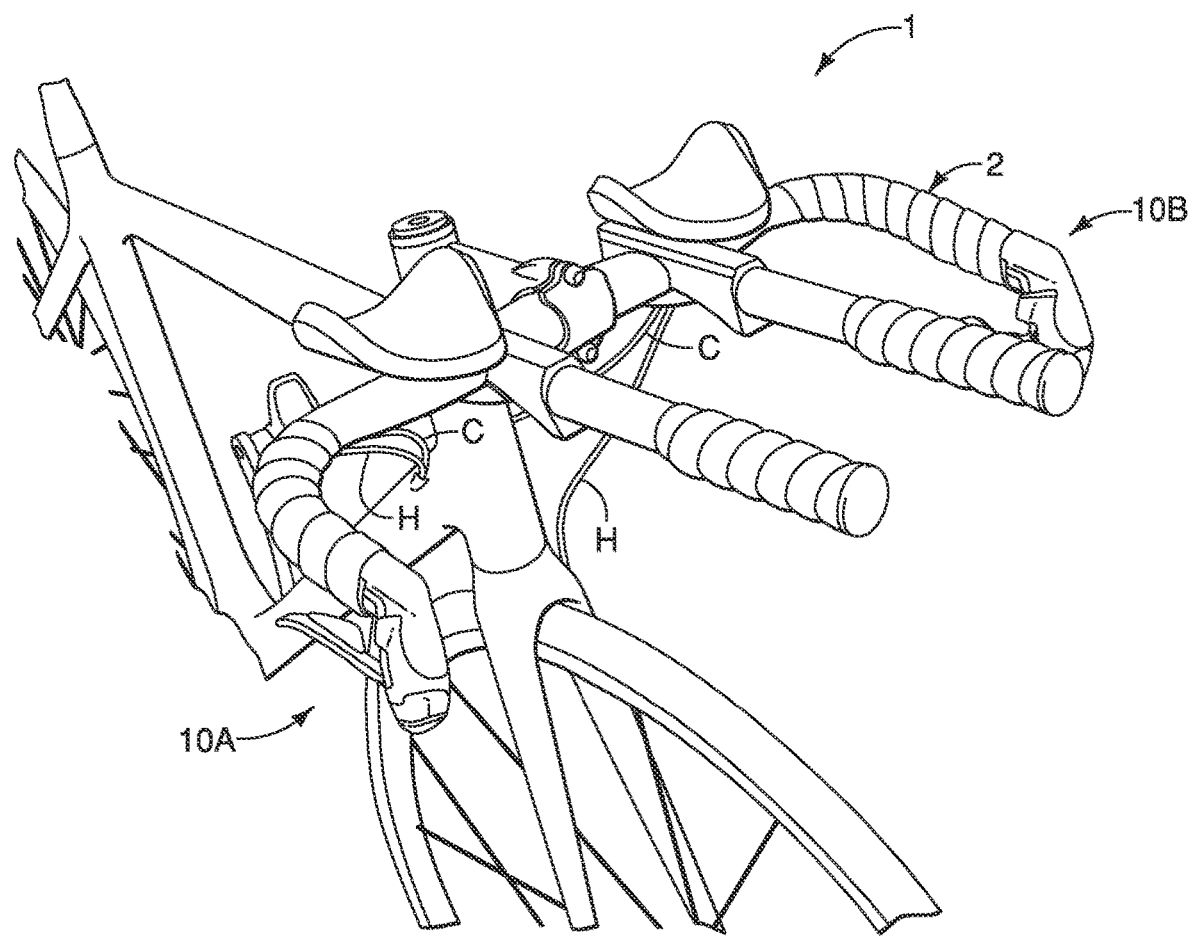
FIG. 1 is a partial front perspective view of a bicycle having a bull horn handlebar that is equipped with a pair of bar-end type bicycle hydraulic operating devices in accordance with a first embodiment.

Referring initially to FIG. 1, a portion of a bicycle 1 is illustrated having a handlebar 2 with a pair of bar-end type bicycle hydraulic operating devices 10A and 10B in accordance with a first embodiment. The bar-end type bicycle hydraulic operating devices 10A and 10B are configured to be mounted to opposite ends of the handlebar 2 which is a time trial or bull horn handlebar, respectively. The bar-end type bicycle hydraulic operating devices 10A and 10B are configured to be mounted to a free end of a handlebar and protrude outwardly in an axial direction from the free end of a handlebar.

Basically, as seen in FIG. 1, the bar-end type bicycle hydraulic operating device 10A is a right hand side operating device that is operated by the rider's right hand to actuate a first hydraulic brake device (not shown) and a first shifting device (not shown). The bar-end type bicycle hydraulic operating device 10B is a left hand side operating device that is operated by the rider's left hand to actuate a second hydraulic brake device (not shown) and a second shifting device (not shown). The first and second shifting devices are part of a conventional bicycle driving system that is used to shift a bicycle chain for changing speed stages or gear stages of the drive train in a relatively conventional manner. The bar-end type bicycle hydraulic operating device 10A is operatively coupled to the first hydraulic brake device (not shown) via a hydraulic hose H, and to the first shifting device (not shown) via a control cable C. The bar-end type bicycle hydraulic operating device 10B is operatively coupled to the second hydraulic brake device (not shown) via a hydraulic hose H, and to the second shifting device (not shown) via a control cable C.

The bar-end type bicycle hydraulic operating devices 10A and 10B are each configured to operate both a shifting device and a hydraulic brake device. However, it will be apparent from this disclosure that the bar-end bicycle hydraulic operating devices 10A and 10B can have only a single operating function (e.g., a braking function or a shifting function). In the illustrated embodiment, the right and left bicycle hydraulic operating devices 10A and 10B are essentially identical in operation, except that they are mirror images of each other and they may have a different number of shift operations. Thus, only the bar-end type bicycle hydraulic operating device 10A will be discussed and illustrated herein.

Referring to FIGS. 2 to 7, the bar-end type bicycle hydraulic operating device (hereinafter "operating device") 10A comprises a base member 12 and a hydraulic unit 14. The base member 12 is configured to be mounted on a handlebar 2. The base member 12 has an abutment 12a that is configured to contact an end of the handlebar 2. The hydraulic unit 14 is provided on the base member 12. In the first embodiment, the operating device 10A further comprises a shift unit 16 that is mounted on the base member 12 as additional unit. In the first embodiment, the operating device 10A further includes a first operating member 18 and a second operating member 20. The first and second operating members 18 and 20 are used to operate the shift unit 16 as explained below. The first operating member 18 is also used to operate the hydraulic unit 14 as explained below. Also as explained below, the first and second operating members 18 and 20 are trigger levers that are biased to their rest positions such that they automatically return to the their rest position upon being released from an operated position. Depending on the configuration of the shift unit 16, the second operating member 20 can be omitted so that the shift unit 16 is solely operated by the first operating member 18.

FIGS. 2 to 8 illustrates the operating device 10A with its various parts in their rest positions. The term "rest position" as used herein refers to a state in which a movable part (e.g., the first and second operating members 18 and 20) remains stationary without the need of a user intervening (e.g., holding the movable part) to establish a state corresponding to the rest position. Thus, the term "rest position" can also be referred to as a non-operated position. The term "end position" as used herein refers a state in which a movable part (e.g., the first and second operating members 18 and 20) is prevent from be moved further away from the rest position in a movement direction of a movement stroke of that movable part. The term "operated position" as used herein refers a state in which a movable part (e.g., first and second operating members 18 and 20) is moved from the rest position to a position as a result of an external force being applied to the movable part.

Figure 2:
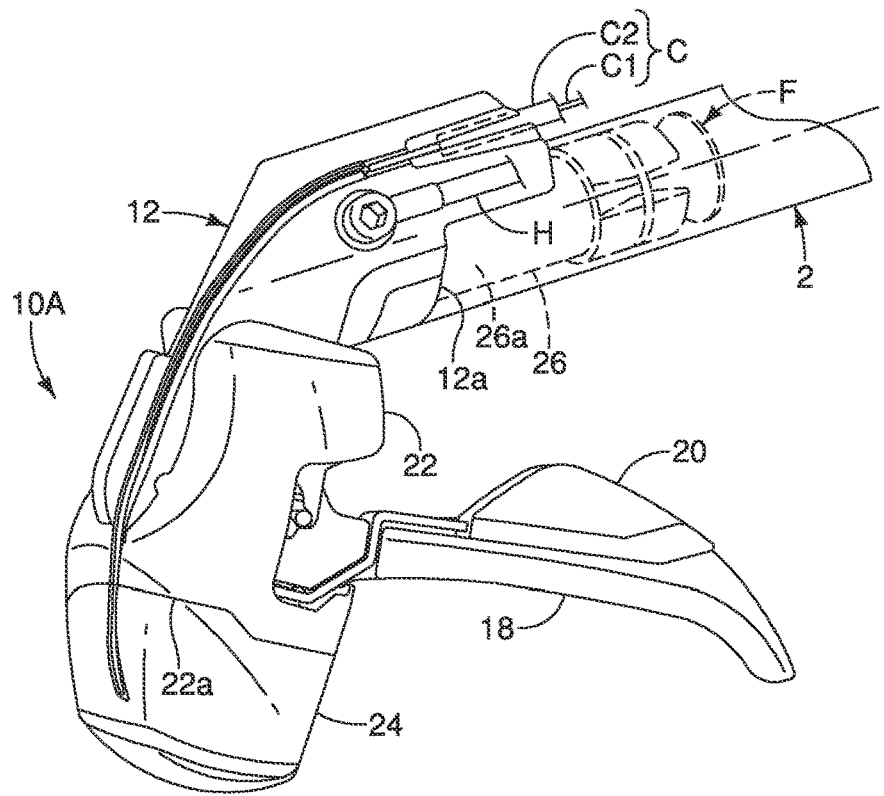
FIG. 2 is an inside perspective view of the right bicycle hydraulic operating device that is attached to the right free end of the handlebar illustrated in FIG. 1.
Figure 3:
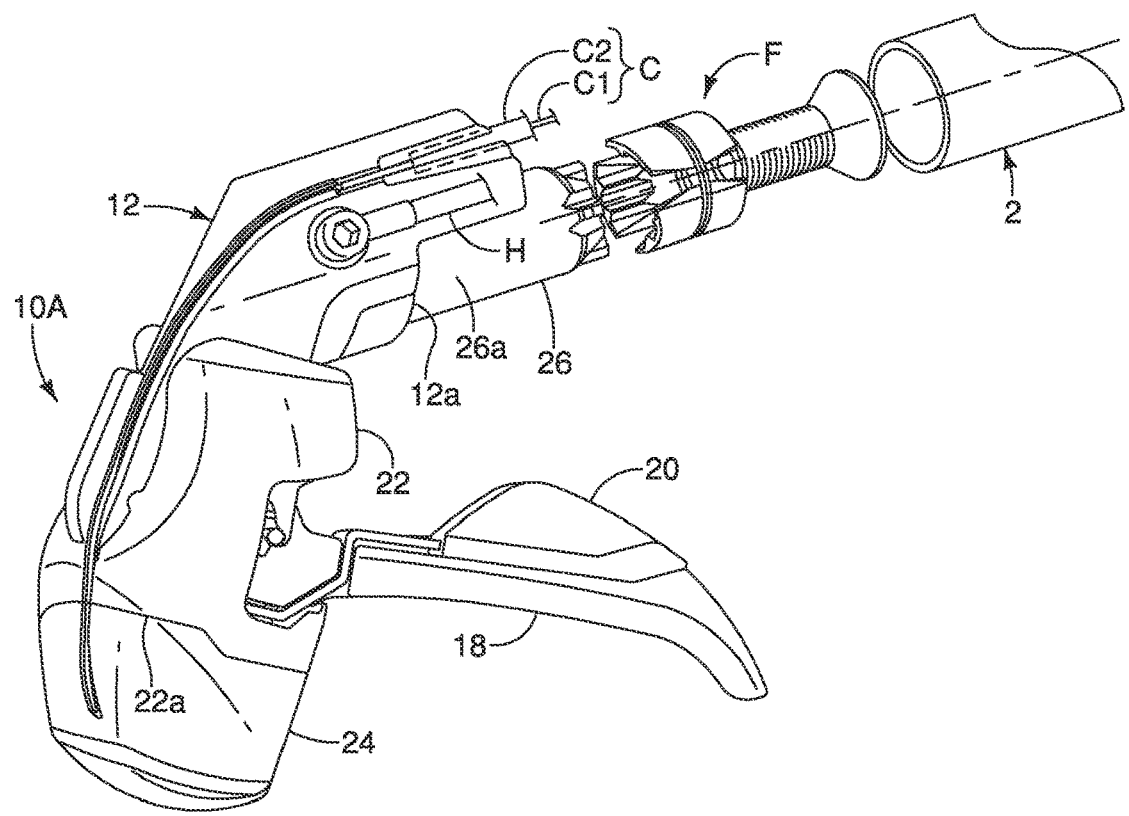
FIG. 3 is an inside perspective view, similar to FIG. 2, of the right bicycle hydraulic operating device, but prior to attachment to right free end of the handlebar illustrated in FIGS. 1 and 2.
Figure 4:
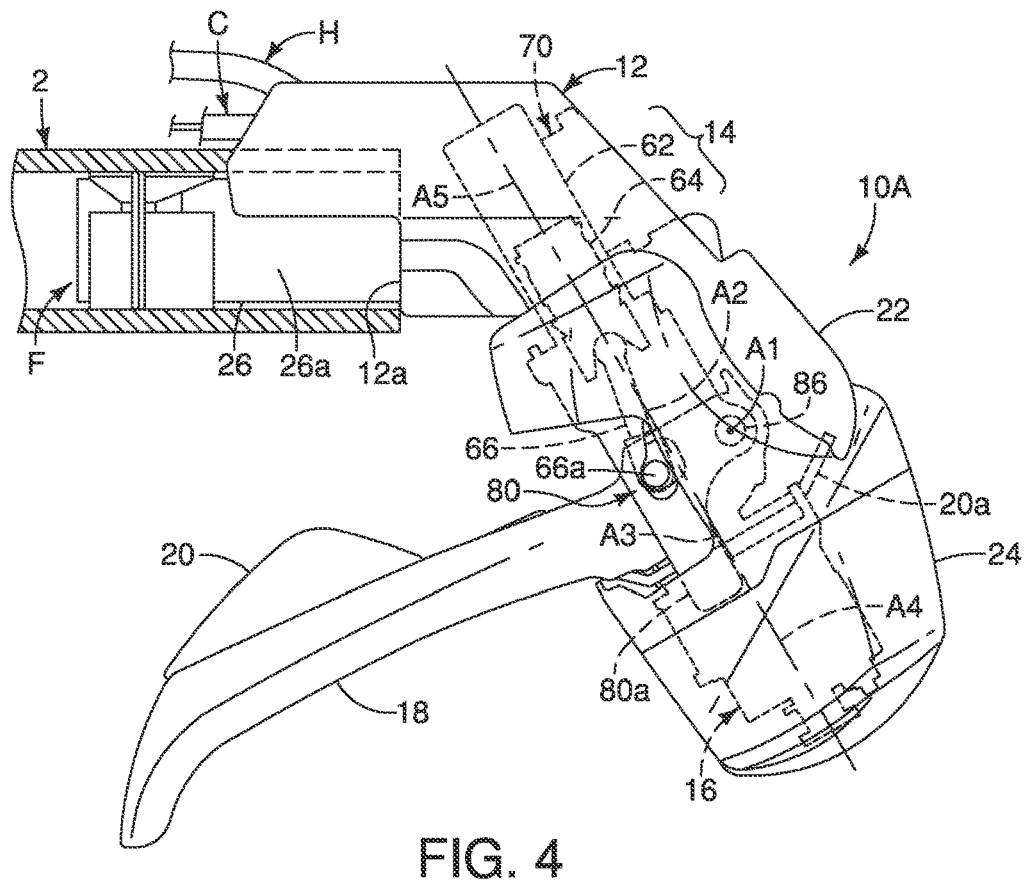
FIG. 4 is an outside elevational view of the right bicycle hydraulic operating device illustrated in FIGS. 1 to 3 with first and second operating members in their rest (non-operated) positions.

As seen in FIGS. 2 and 3, the base member 12 is configured to be coupled to an end portion of the handlebar 2. The base member 12 houses both the hydraulic unit 14 and the shift unit 16. The base member 12 basically includes a base portion 22 and a shift unit attachment portion (hereinafter, "attachment portion") 24. The base portion 22 and the attachment portion 24 are hard, rigid members that are made of a suitable material such as a hard rigid plastic material. The hydraulic unit 14 is mounted to the base portion 22 of the base member 12. The shift unit 16 is mounted to the attachment portion 24 of the base member 12. With this configuration, the hydraulic unit 14 is mounted to the base member 12 in a location that is closer to the handlebar 2 than the shift unit 16 in a state where the operating device 10A is mounted to the handlebar 2.

The base portion 22 of the base member 12 includes a coupling portion 26 that is configured to be coupled to the handlebar 2. The coupling portion 26 defines a proximal end of the base portion 22 of the base member 12 with respect to an end portion of the handlebar 2. In this embodiment, the coupling portion 26 is configured to be coupled to an end portion of the handlebar 2. In more detail, the coupling portion 26 has a cylindrical shape such that the coupling portion 26 is inserted to an opening provided on the end portion of the handlebar 2. The coupling portion 26 of the base member 12 is fixedly mounted to the handlebar 2 by a fixing structure F that is provided on the coupling portion 26. The fixing structure F is disposed inside the end portion of the handlebar 2 in the state where the base member 12 is mounted to the handlebar 2. In the first embodiment, the portions of the base member 12 rearward of the first and second operating members 18 and 20, except for the coupling portion 26, can be considered as a gripping portion of the operating device 10A.

Since such the fixing structure F is conventional and well known within the bicycle field, it will not be discussed in detail herein for the sake of brevity. The coupling portion 26 of the base member 12 further includes a mounting surface 26a that is configured to be coupled to the handlebar 2. In this way, the base portion 22 has the mounting surface 26a.

Figure 7:
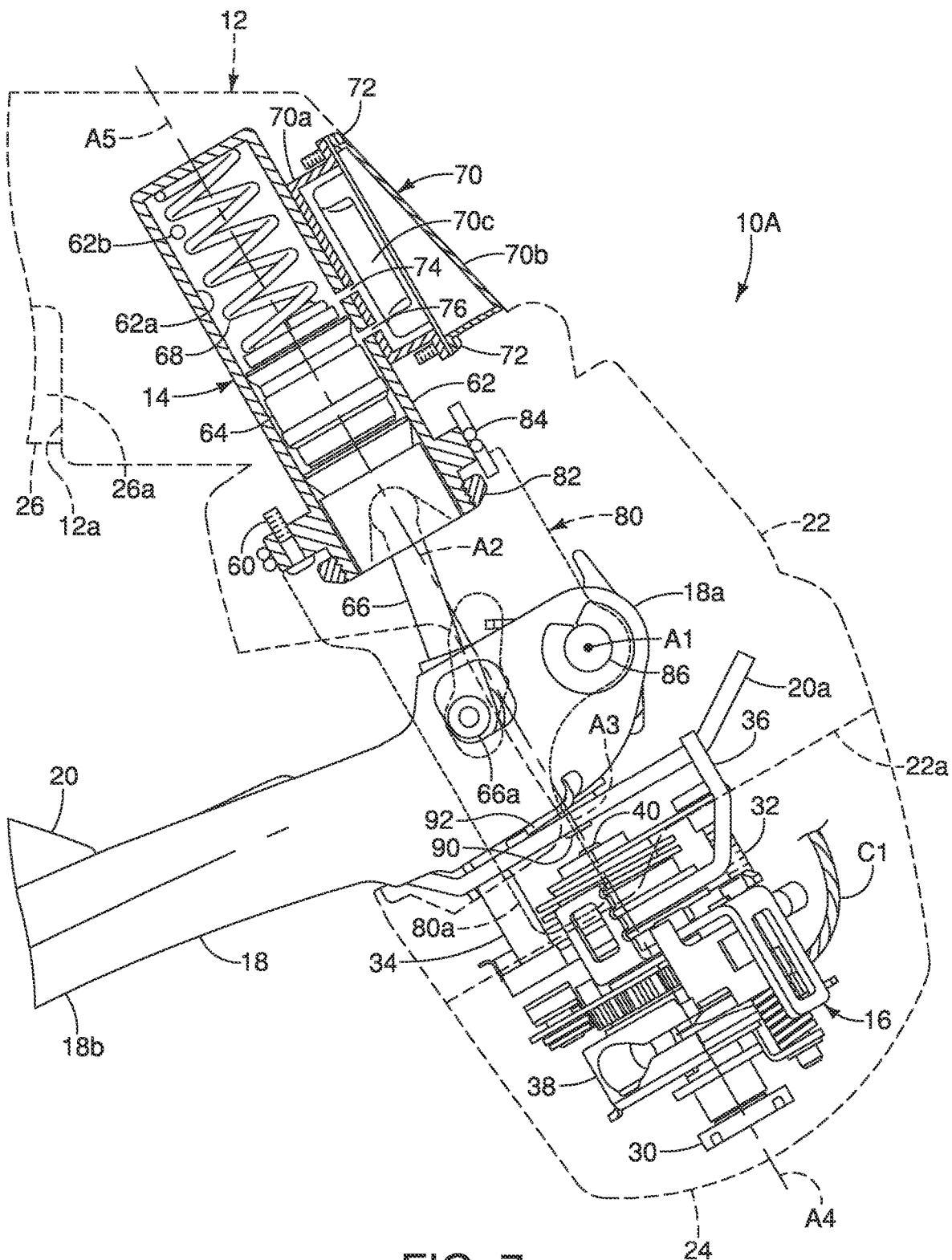
FIG. 7 is an outside elevational view of selected internal parts of the right bicycle hydraulic operating device illustrated in FIGS. 1 to 6 with the first and second operating members in their rest positions and selected internal parts of a hydraulic unit shown in cross section.
Figure 11:
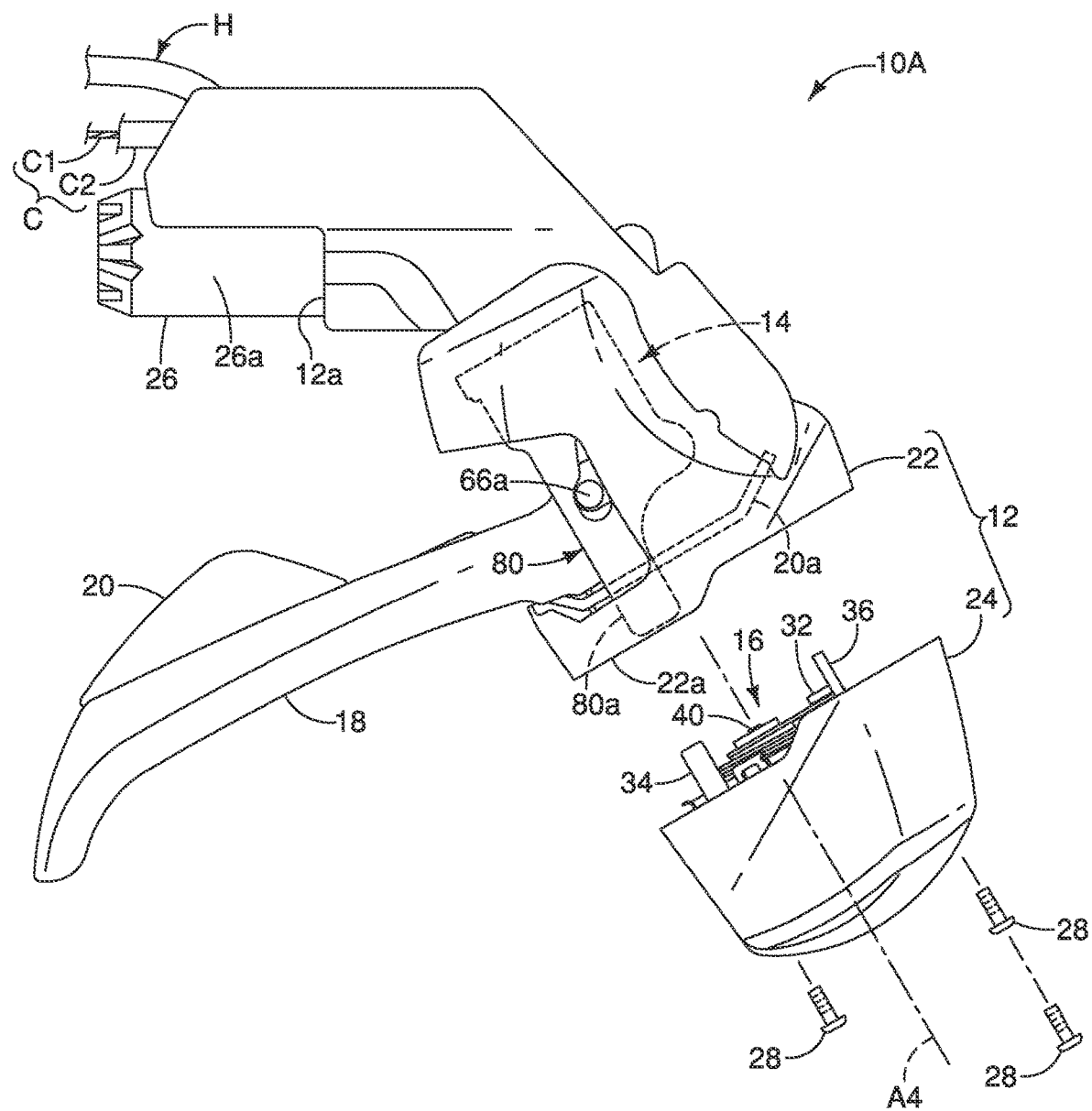
FIG. 11 is an outside elevational view of the right bicycle hydraulic operating device illustrated in FIGS. 1 to 10 with an attachment portion of the base member detached from a base portion of the base member so that the shift unit is detached from the base portion of the base member.

Referring to FIGS. 7 and 11, the base portion 22 of the base member 12 has a distal end 22a that is at the opposite end of the base portion 22 of the base member 12 from the coupling portion 26. The attachment portion 24 is configured to be removably attached to the distal end 22a of the base portion 22. The attachment portion 24 is configured to cover the shift unit 16. In particular, three screws 28 are used to removably attach the attachment portion 24 to the distal end 22a of the base portion 22 of the base member 12. With this configuration, the shift unit 16 is mounted to the distal end 22a of the base member 12 which is opposite to the mounting surface 26a. In other words, the attachment portion 24 is located at the distal end 22a of the base member 12 with respect to the handlebar 2 in the state where the base portion 22 is mounted to the handlebar 2.

Figure 12:
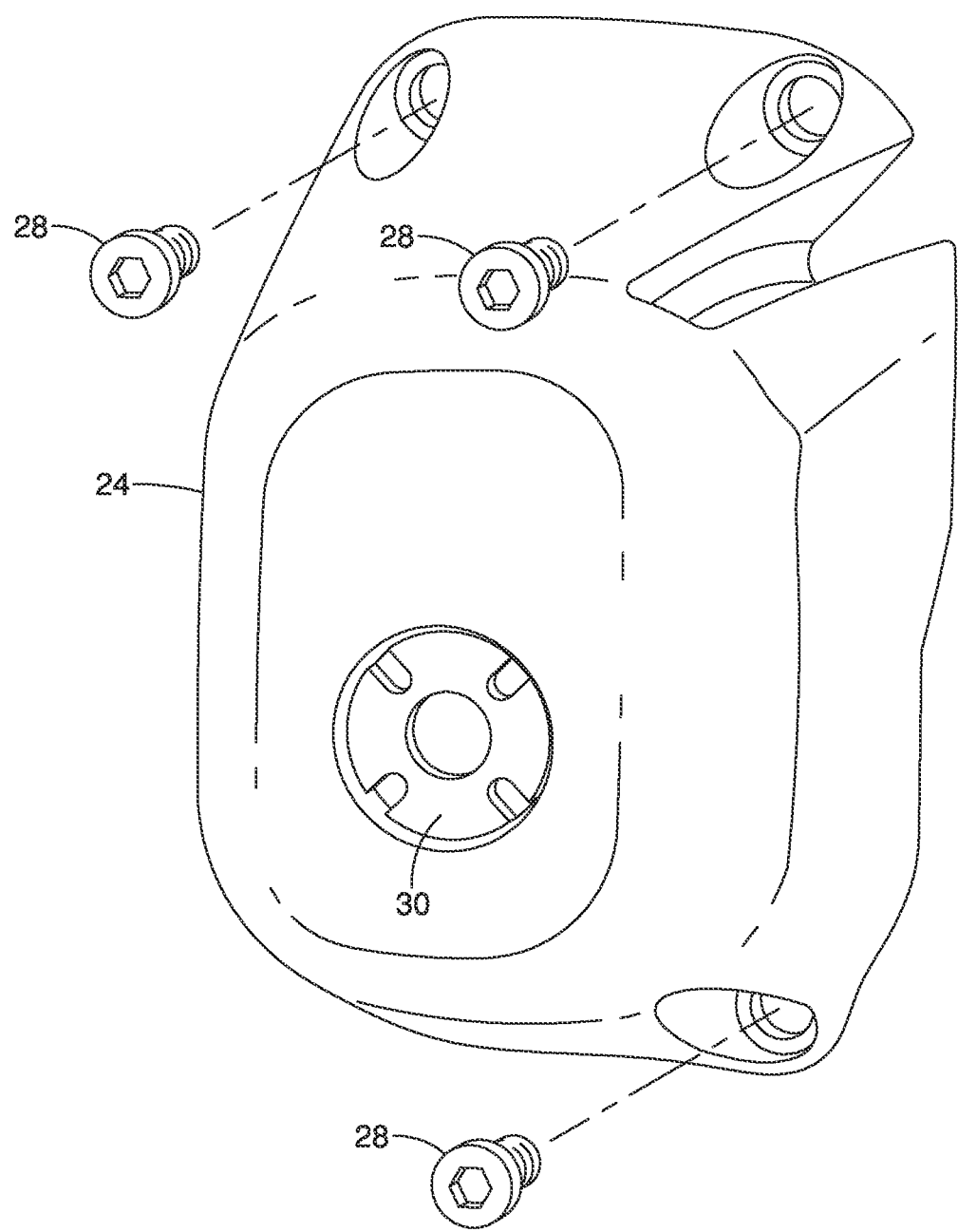
FIG. 12 is a front perspective view of the attachment portion of the right bicycle hydraulic operating device illustrated in FIGS. 1 to 11.
Figure 13:
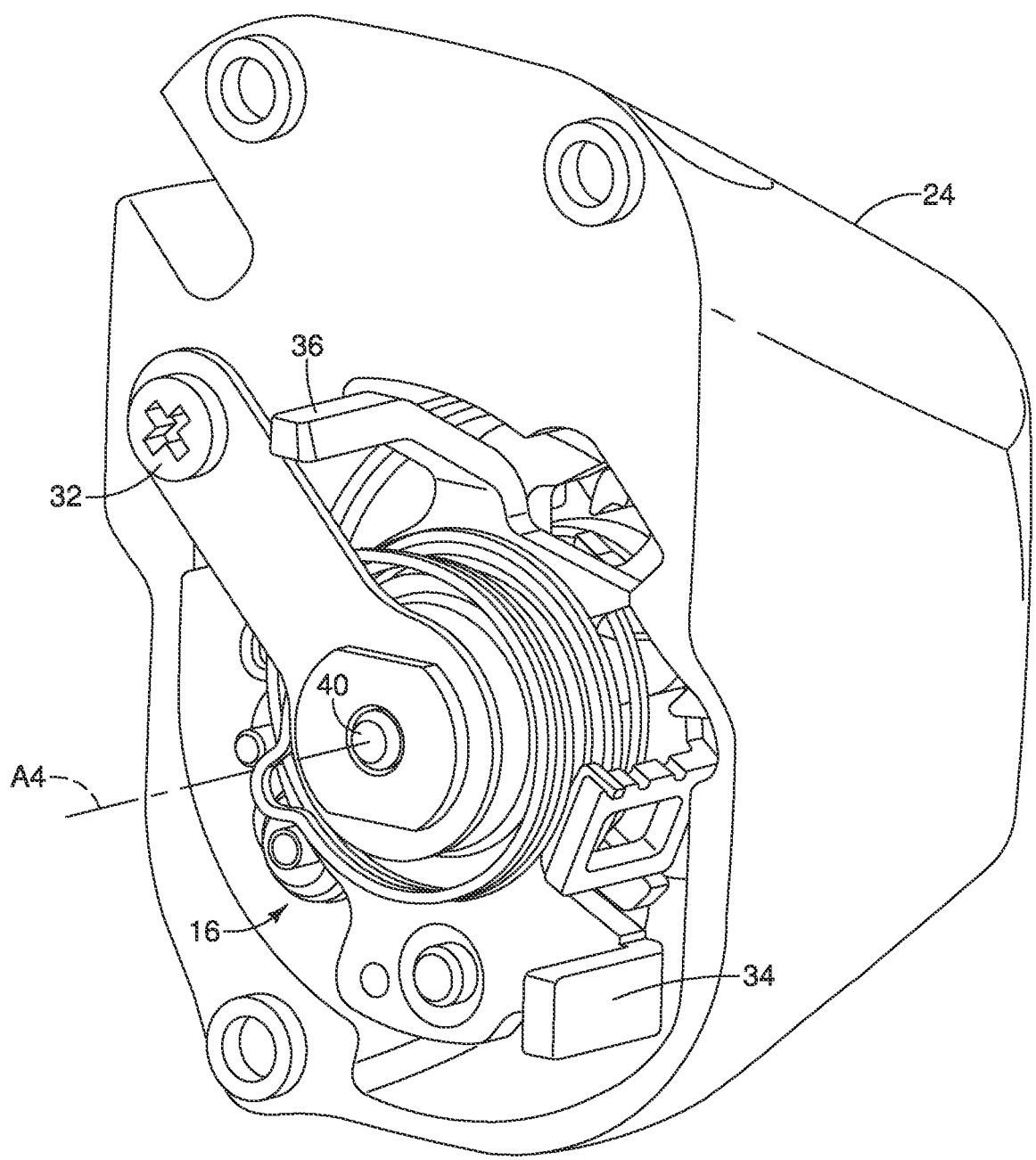
FIG. 13 is a rear perspective view of the attachment portion illustrated in FIG. 12 for the right bicycle hydraulic operating device illustrated in FIGS. 1 to 12.

As seen in FIGS. 11 to 13, the shift unit 16 is mounted to the attachment portion 24. In particular, the shift unit 16 is secured to the attachment portion 24 by a nut 30 and a screw 32. In this way, the attachment portion 24 is removably mounted to the base portion 22 with the shift unit 16 being mounted to the attachment portion 24 as unit. In other words, when the screws 28 are removed, the shift unit 16 will be detached from the base portion 22 of the base member 12, but will remain attached to the attachment portion 24.

Figure 8:
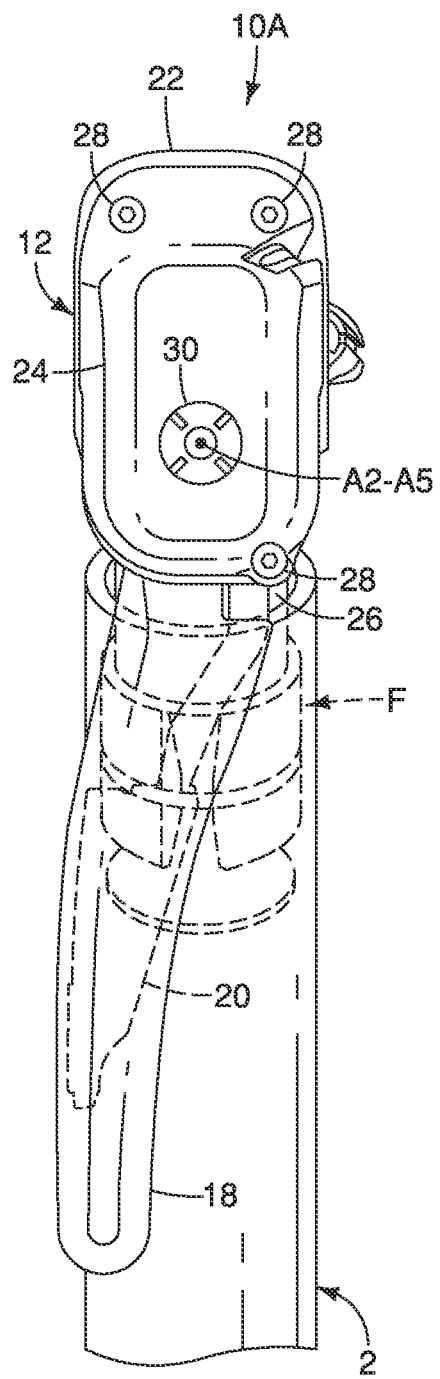
FIG. 8 is a front oblique view of the right bicycle hydraulic operating device illustrated in FIGS. 1 to 7 as viewed parallel to a take-up axis of a shift unit with the first and second operating members in their rest positions.
Figure 9:
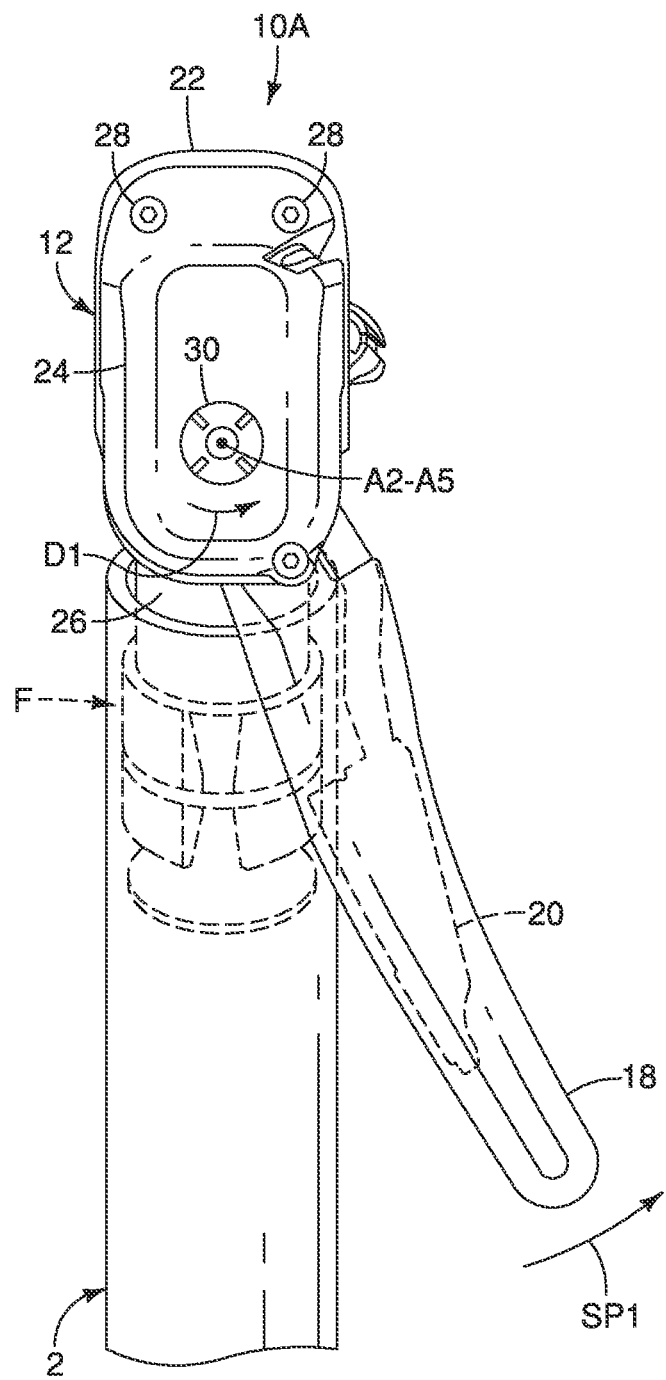
FIG. 9 is a front oblique view of the right bicycle hydraulic operating device illustrated in FIGS. 1 to 8 as viewed parallel to the take-up axis of the shift unit with the first operating member pivoted about a second pivot axis to a cable pulling position, which causes the second operating member to be pivoted together with the first operating member about the second pivot axis with respect to the base member.
Figure 10:
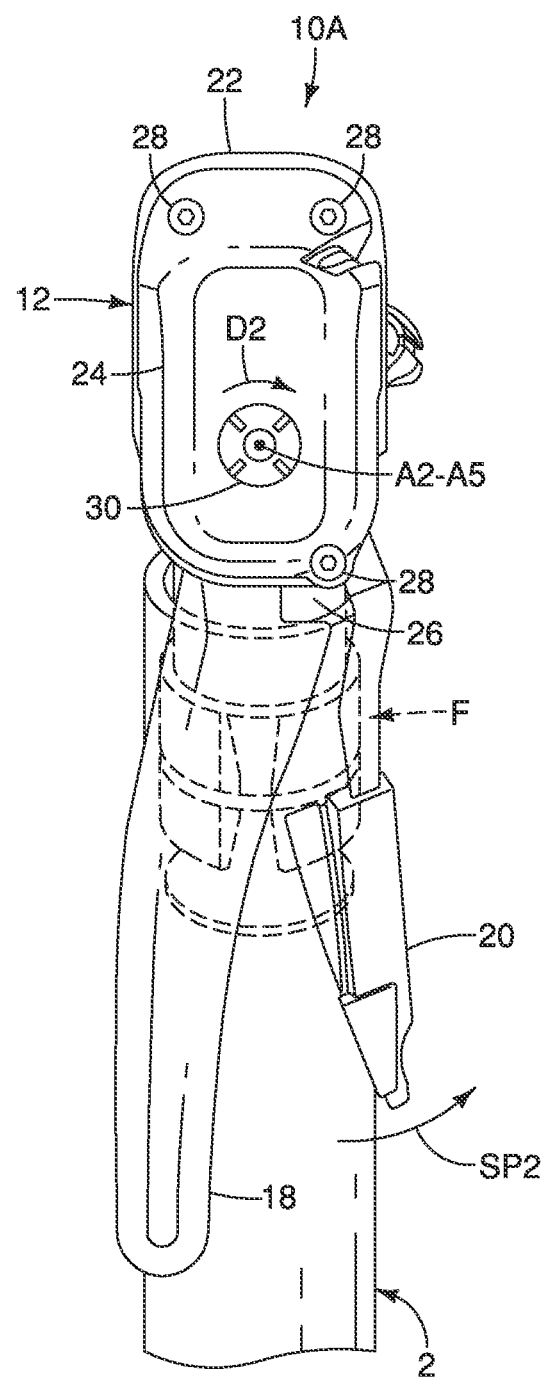
FIG. 10 is a front oblique view of the right bicycle hydraulic operating device illustrated in FIGS. 1 to 9 as viewed parallel to the take-up axis of the shift unit with the second operating member pivoted about the second pivot axis to a cable releasing position, in which the first operating member remains stationary with respect to the base member.

Referring to FIGS. 8 to 10, the movements of the first and second operating members 18 and 20 will now be discussed. The first operating member 18 is pivotally mounted relative to the base member 12 around a first pivot axis A1 to operate the hydraulic unit 14. The first operating member 18 is further configured to be pivoted around a second pivot axis A2 that is different from the first pivot axis A1 to actuate the shift unit 16. The second operating member 20 is pivotally mounted relative to the base member 12 around a third pivot axis A3 to operate the shift unit 16. The third pivot axis A3 is coaxial with the second pivot axis A2. With this configuration, the first operating member 18 is configured to perform a braking operation when moved along a braking path BP (FIG. 5) generally parallel to a center longitudinal plane of the bicycle 1, and a cable pulling operation when moved along a first shifting path SP1 (FIG. 9) towards the center longitudinal plane of the bicycle 1. On the other hand, the second operating member 20 is configured to perform a cable releasing operation when moved along a second shifting path SP2 (FIG. 10) towards the center longitudinal plane of the bicycle 1. The shift unit 16 remains stationary as the first operating member 18 pivots with respect to the base member 12 around the first pivot axis A1 to perform the braking operation.

As seen in FIGS. 7 and 13, the shift unit or additional unit 16 is mounted to the attachment portion 24 of the base member 12 to operate the first shifting device (not shown), e.g. a front derailleur, a rear derailleur, or an internal transmission device. The shift unit 16 is operatively coupled to the first shifting device via the control cable C. The control cable C is a conventional Bowden cable including an inner cable C1 and an outer casing C2 which at least partially covers the inner cable C1. The shift unit or additional unit 16 is constructed as a mechanical shift unit that is configured to operate the control cable C. In more detail, the shift unit 16 is configured to pull and release the inner cable C1 of the control cable C to operate the first shifting device. The shift unit 16 pulls or releases the inner cable C1 in response to operation of the first and second operating members 18 and 20. Here, in the first embodiment, the operation of the first operating member 18 cause the shift unit 16 to pull the inner cable C1, while the operation of the second operating member 20 cause the shift unit 16 to release the inner cable C1.

Figure 16:
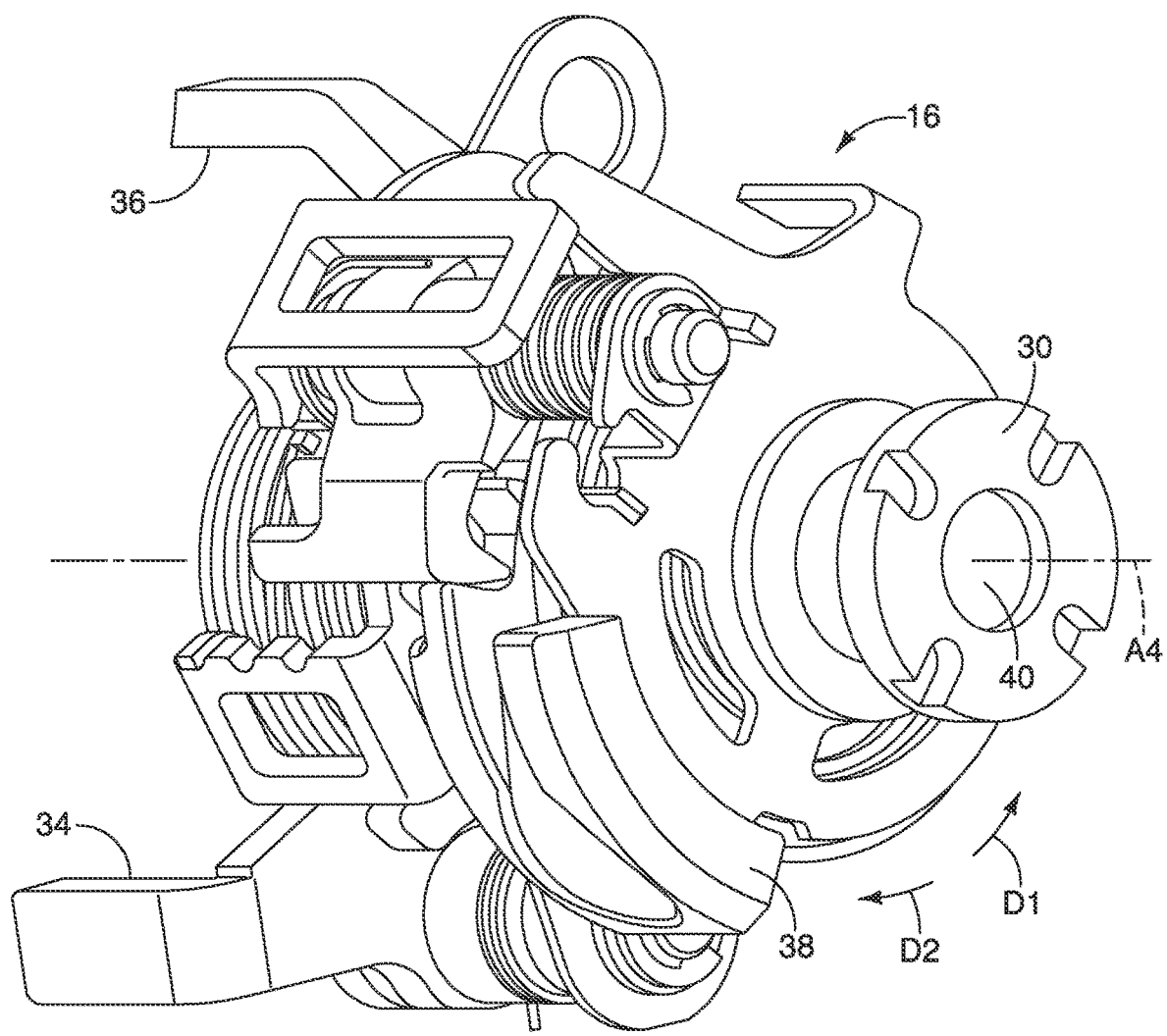
FIG. 16 is a front perspective view of the shift unit of the right bicycle hydraulic operating device illustrated in FIGS. 1 to 11.

Here, as seen in FIGS. 7 and 16, the shift unit 16 basically includes a first input member 34, a second input member 36 and a cable take-up member or spool 38. The cable take-up member 38 and the first and second input members 34 and 36 are coaxially arranged on a main shift axle 40 of the shift unit 16. The main shift axle 40 pivotally supports the take-up member 38 and the first and second input members 34 and 36 relative to the base member 12 for pivotal movement. The main shift axle 40 defines a take-up axis A4 of the shift unit 16. Thus, the take-up member 38 is configured to be rotatable around the take-up axis A4 in response to operation of the first and second operating members 18 and 20. In the first embodiment, the take-up axis A4 is coaxial with the second pivot axis A2. Specifically, the take-up axis A4 is coaxial with the second and third pivot axes A2 and A3. Basically, the cable take-up member 38 rotates in opposite rotational directions about the take-up axis A4 in response to operation of the first and second input members 34 and 36.

More specifically, when the first operating member 18 is pivoted along the first shifting path SP1 towards the center longitudinal plane of the bicycle 1 (FIG. 9), the first operating member 18 causes the first input member 34 to pivot about the take-up axis A4. The pivotal movement of the first input member 34 causes the cable take-up member 38 to rotate in a first (cable pulling) direction D1 (FIG. 16). In particular, the first input member 34 has a pulling pawl that engages ratchet teeth of a pulling plate that is attached to the cable take-up member 38. Upon releasing the first operating member 18, the first input member 34 returns to its original rest position together with the first operating member 18. In this way, the shift unit 16 is configured to rotate the cable take-up member 38 in the first direction D1 about the cable take-up axis A4 as the first operating member 18 is moved from the rest position to the first shift position.

On the other hand, when second operating member 20 is pivoted along the second shifting path SP2 towards the center longitudinal plane of the bicycle 1 (FIG. 10), the second operating member 20 causes the second input member 36 to pivot about the take-up axis A4. The pivotal movement of the second input member 36 causes the cable take-up member 38 to rotate in a second (cable releasing) direction D2, which is opposite to the first (cable pulling) direction D1 with respect to the take-up axis A4 (FIG. 16). In particular, the second input member 36 has a release pawl that engages a tooth of a release plate that disengages a position maintaining pawl from one of a plurality of positioning teeth of a positioning plate that is attached to the cable take-up member 38. Preferably, the release plate engages a stopping pawl that selectively moves the stopping pawl from a non-stop or unrestricting position and a stop or restricting position. In the non-stop (rest) position, the stopping pawl is located out of the path of the positioning teeth of the positioning plate, and stop position, the stopping pawl is located in the path of the positioning teeth of the positioning plate to engage one of the positioning teeth of the positioning plate to restrict movement of the cable take-up member 38. Upon releasing the second operating member 20, the second input member 36 returns to its original rest position together with the second operating member 20. In this way, the shift unit 16 is configured to rotate the cable take-up member 38 in the second direction D2 about the cable take-up axis A4 as the second operating member 20 is moved from the rest position to the second shift position. The second direction is opposite to the first direction.

Since mechanical shift units, similar to the shift unit 16, are conventional and well known within the bicycle field, the shift unit 16 will not be described and/or illustrated in further detail herein for the sake of brevity. Basically, the shift unit 16 basically operates to pull and release the inner cable C1 in response to operation of the first and second operating members 18 and 20 in the same manner as the shift operating unit that is described in U.S. Patent Application Publication No. 2012/0297919. However, the mounting of the shift unit 16 to the base member 12 is different from the shift control mechanism disclosed in this U.S. Patent Publication. Also the shift unit 16 further differs from the operating unit disclosed in this U.S. Patent Publication in that the first and second operating members 18 and 20 are located rearward of the shift unit 16.

As seen in FIG. 7, the hydraulic unit 14 is mounted to the base member 12 at a location that is closer to the handlebar 2 than the shift unit 16 in a state where the operating device 10A is mounted to the handlebar 2. Thus, the hydraulic unit 14 is mounted to the base member 12 in a location that is closer to the coupling portion 26 than the shift unit 16. Also with this arrangement, the hydraulic unit 14 is mounted to the base member 12 so as to be disposed between the mounting surface 26a and the shift unit 16 without overlapping with the shift unit 16 in any direction perpendicular to the longitudinal center axis A5 of the hydraulic unit 14.

In the first embodiment, the hydraulic unit 14 is detachably mounted to the base member 12 by a screw 60 (FIG. 7). Basically, the hydraulic unit 14 includes a hydraulic cylinder 62 that has a cylinder bore 62a and a piston 64 that is movably disposed in the cylinder bore 62a. The hydraulic cylinder 62 is disposed outside the handlebar 2 in the state where the base member 12 is mounted to the handlebar 2. The hydraulic cylinder 62 defines a longitudinal center axis A5. The piston 64 is movably disposed in the hydraulic cylinder 62 along the longitudinal center axis A5. Preferably, the hydraulic unit 14 is detachably mounted to the base member 12 so as to be detached and reattached to the base member 12. In the first embodiment, the hydraulic cylinder 62 is disposed in a recess of the base portion 22 of the base member 12. A piston rod 66 operatively connects the first operating member 18 to the piston 64 such that pivotal movement of the first operating member 18 around the first pivot axis A1 cause the piston 64 to move from a rest position (FIG. 4) to an actuated position (FIG. 5) along the longitudinal center axis A5. The first operating member 18 is pivotally connected to a first end of the piston rod 66 by a pivot pin 66a. The piston rod 66 has a second end with a partially spherical convex surface that contacts a partially spherical concave surface of the end of the piston 64. In this way, the piston rod 66 is pivotally connected to the piston 64. In this way, the first operating member 18 is connected to the piston 64 so as to move the piston 64 in the hydraulic cylinder 162 as the first operating member 18 is pivoted around the first pivot axis A1.

Figure 5:
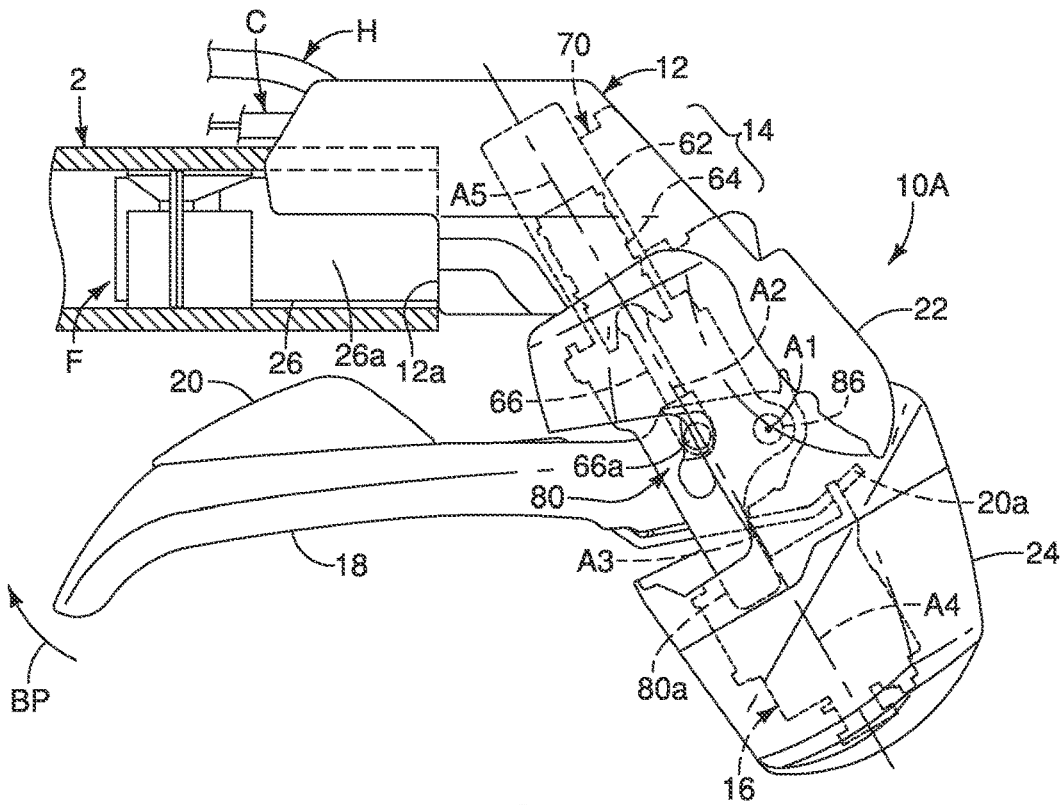
FIG. 5 is an outside elevational view, similar to FIG. 4, of the right bicycle hydraulic operating device, but with the first operating member (i.e., the brake-shift cable pull lever) pivoted about a first pivot axis to the braking position, which causes the second operating member (i.e., the shift cable release lever) to be pivoted together with the first operating member about the first pivot axis with respect to a base member.
Figure 6:
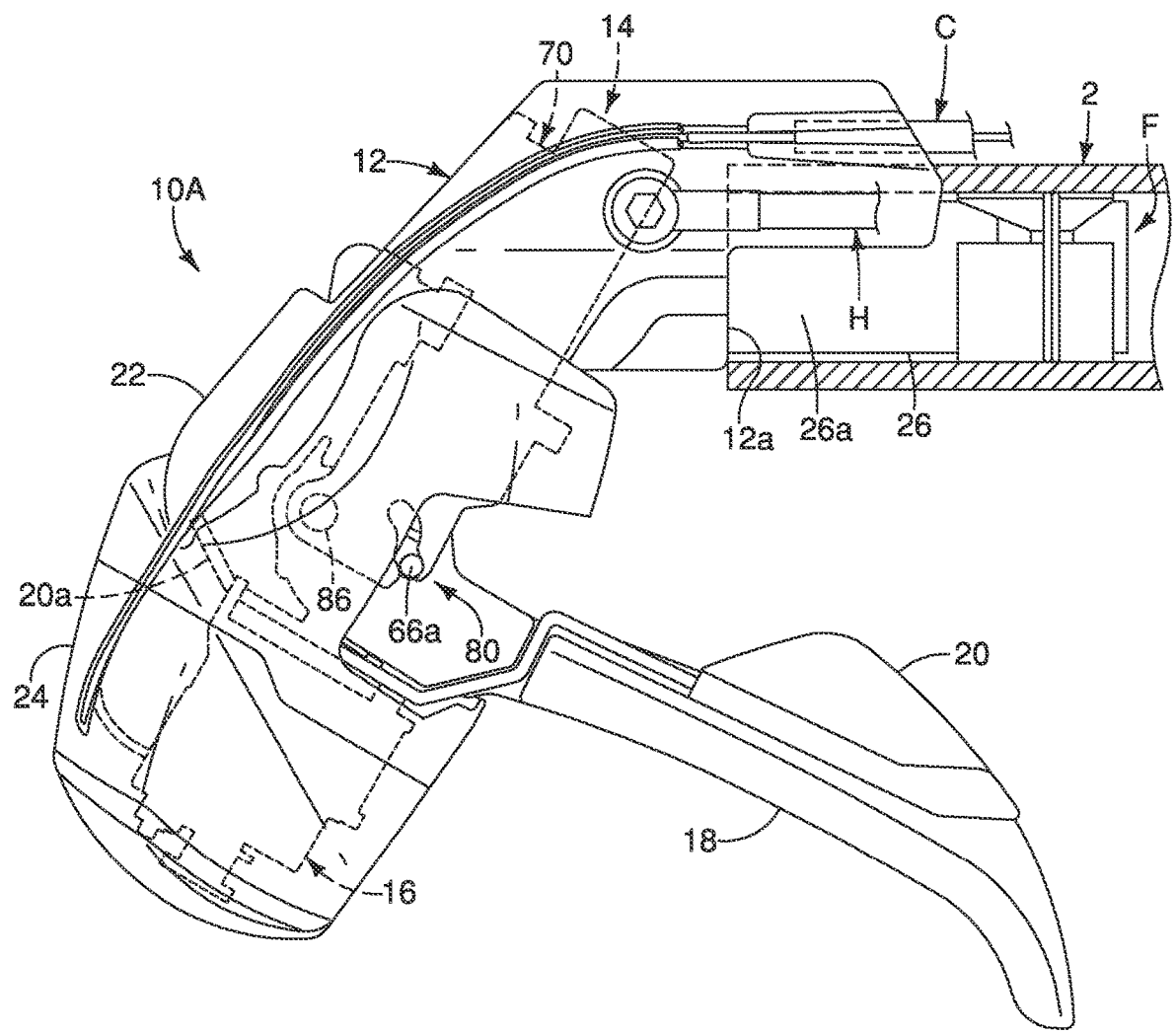
FIG. 6 is an enlarged inside elevational view of the right bicycle hydraulic operating device illustrated in FIGS. 1 to 5 with the first and second operating members in their rest positions.

The piston 64 is movably arranged in the hydraulic cylinder 62 for reciprocal movement along the longitudinal center axis A5. As seen in FIG. 7, the hydraulic cylinder 62 of the hydraulic unit 14 has a fluid outlet 62b that is located adjacent to the mounting surface 26a. The hydraulic cylinder 62 is in fluid communication with the hydraulic braking device (not shown) via the hydraulic hose H to operate the hydraulic braking device in response to movement of the piston 64 from the rest position (FIG. 4) to the actuated position (FIG. 5). The hydraulic unit 14 further includes a biasing element 68 that is disposed inside the hydraulic cylinder 62 between a closed end wall of the hydraulic cylinder 62 and the piston 64. The biasing element 68 biases the piston 64 to a non-braking position. The biasing element 68 also acts as a return spring for biasing the first operating member 18 to its rest position with respect to first pivot axis A1. Here, the biasing element 68 is a coil compression spring.

As seen in FIG. 7, the hydraulic unit 14 includes a reservoir 70 fluidly communicating with the cylinder bore 62a. The reservoir 70 is disposed outside the handlebar 2 in the state where the base member 12 is mounted to the handlebar 2. The reservoir 70 is detachably mounted to the base member 12 so as to be detached and reattached to the base member 12. In particular, the reservoir 70 is fastened to the base member 12 by a pair of screws 72. The reservoir 70 basically comprises a reservoir tank 70a, a reservoir cap 70b and a diaphragm 70c. The base member 12 includes a fluid passage 74 connecting the cylinder bore 62a and the reservoir tank 70a of the reservoir 70. In this way, the reservoir tank 70a fluidly communicates with the hydraulic chamber of the cylinder bore 62a of the hydraulic cylinder 62 via the fluid passage 74 while the first operating member 18 is in a rest position. The base member 12 includes a fluid passage 76 connecting the cylinder bore 62a and the reservoir tank 70a of the reservoir 70 for lubricating the piston 64.

In the first embodiment, the reservoir 70 is disposed in a recess of the base portion 22 of the base member 12. The recess in the base portion 22 for the reservoir 70 intersects with the recess in the base portion 22 for the hydraulic cylinder 62. In this way, the inlet ports of the hydraulic cylinder 62 mates with the outlet ports of the reservoir tank 70a so that hydraulic fluid is supplied from the reservoir 70 to the hydraulic cylinder 62 before the piston 64 is pushed in response to the operation of the first operating member 18 about the first pivot axis A1.

Figure 14:
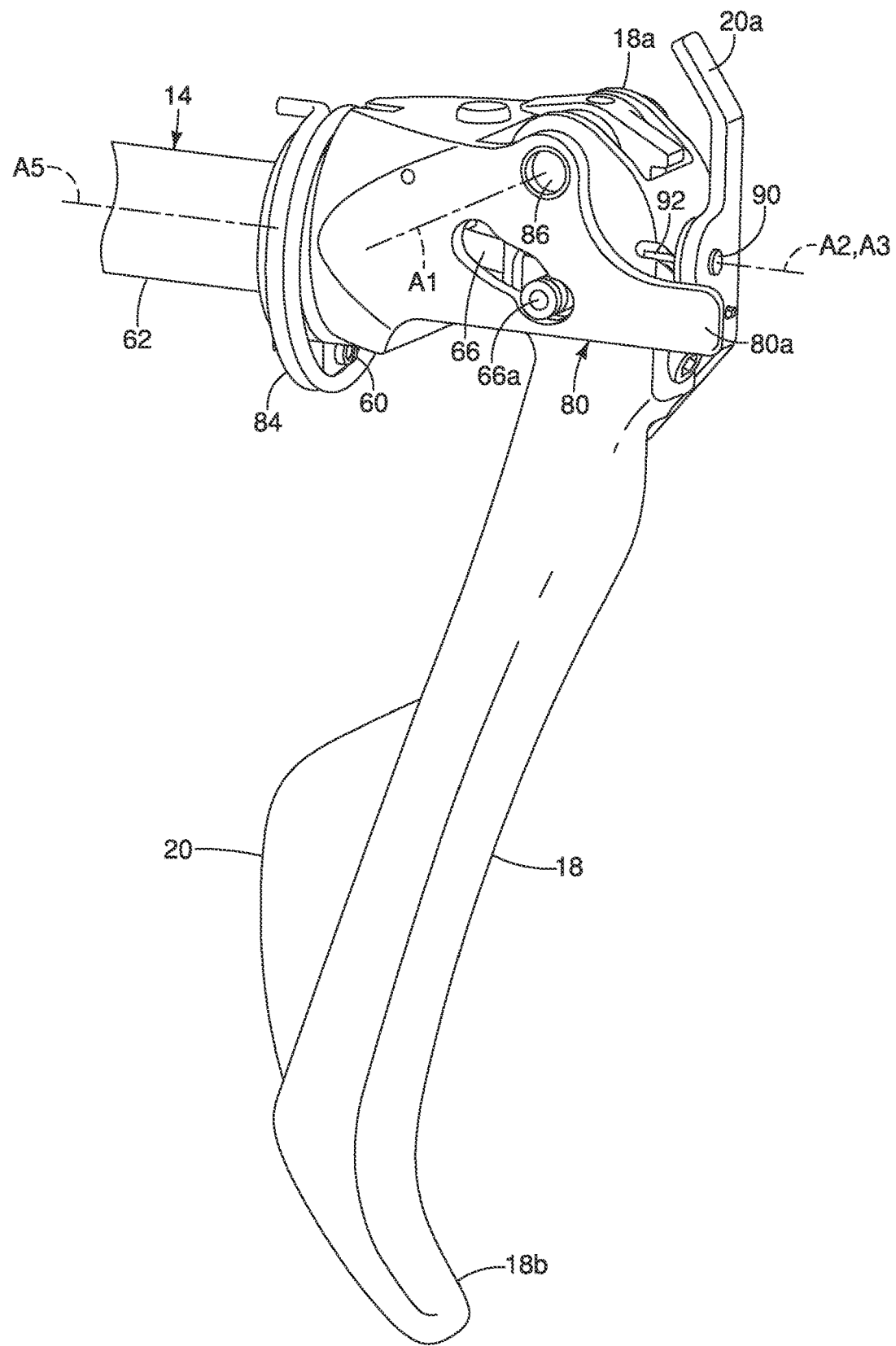
FIG. 14 is an outside perspective view of an actuating unit (the first and second operating members and the attachment member) of the right bicycle hydraulic operating device illustrated in FIGS. 1 to 11.
Figure 15:
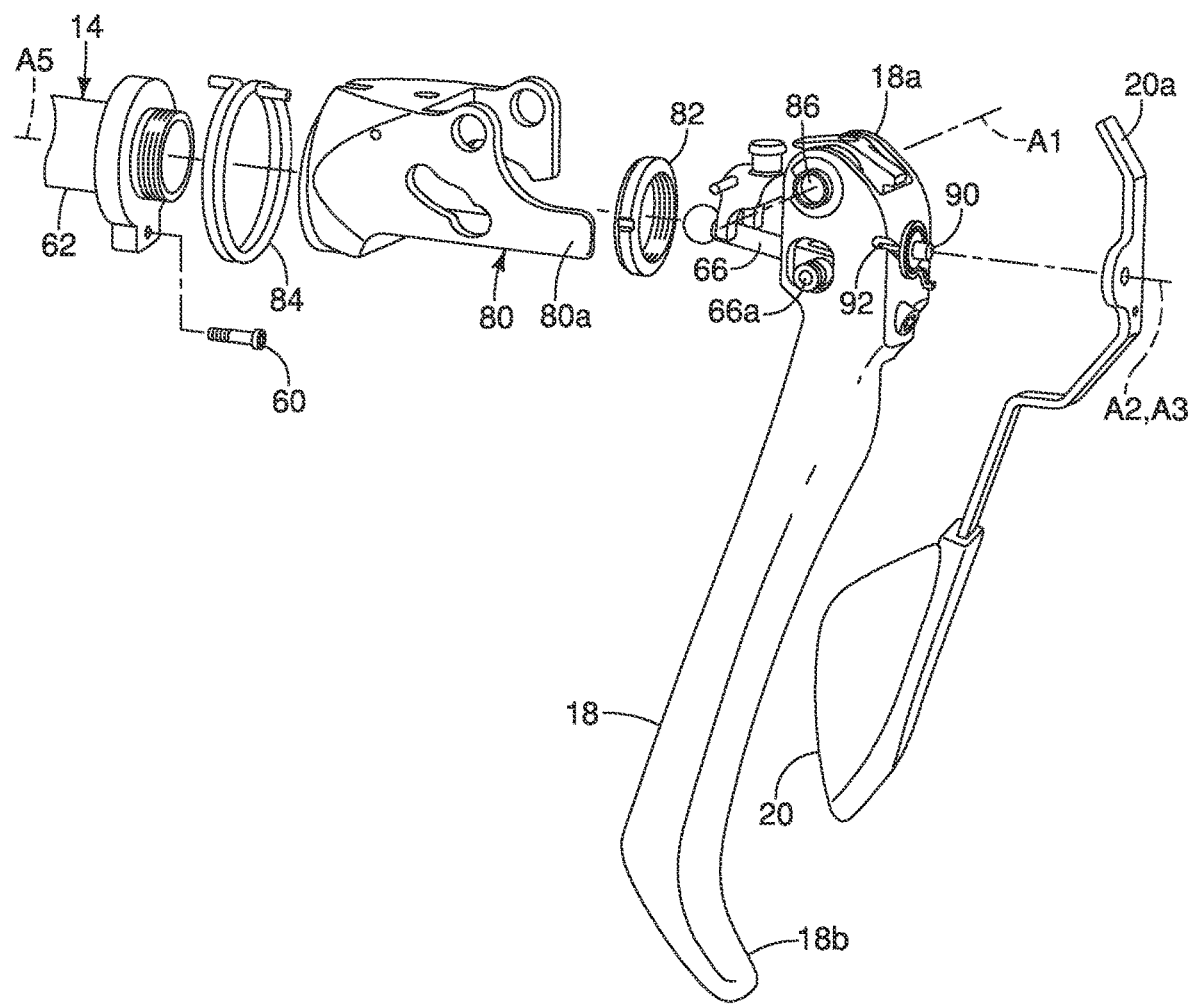
FIG. 15 is a partially exploded perspective view of the actuating unit illustrated in FIG. 14 for the right bicycle hydraulic operating device illustrated in FIGS. 1 to 11.

As seen in FIGS. 7, 14 and 15, the operating device 10A further comprises an attachment member 80, The attachment member 80 supports the first and second operating members 18 and 20 to the base member 12. Thus, the first and second operating members 18 and 20 and the attachment member 80 form an actuating unit of the operating device 10A, The attachment member 80 is pivotally coupled to the hydraulic unit 14 around the second pivot axis A2. In particular, the attachment member 80 is pivotally secured to the hydraulic cylinder 62 of the hydraulic unit 14 by a nut 82, Thus, the attachment member 80 defines the second pivot axis A2. The longitudinal center axis A5 of the hydraulic unit 14 is coaxial with the second pivot axis A2. Further, the take-up axis A4 of the take-up member 38 is coaxial with the second pivot axis A2 (FIG. 7). The attachment member 80 has an actuating part 80a. The actuating part 80a is arranged to contact the first input member 34 of the shift unit 16 (FIG. 16) as the attachment member 80 pivots from the rest position to the operated position about the second pivot axis A2. Thus, the attachment member 80 causes the cable take-up member 38 to rotate in the first (cable pulling) direction D1 in response to the operation of the first operating member 18.

A biasing element 84 is operatively disposed between the attachment member 80 and the base member 12 to bias the attachment member 80 to its rest position. Here, the biasing element 84 is a torsion spring with a first end disposed in a hole in the base portion 22 of the base member 12 and a second end disposed in a recess in the attachment member 80. The biasing element 84 biases the attachment member 80 against the base portion 22 of the base member 12 to establish the rest position of the attachment member 80. The biasing element 84 also acts as a return spring for biasing the first operating member 18 to its rest position with respect to the second pivot axis A2.

As seen in FIGS. 7, 14 and 15, the first operating member 18 will be discussed in more detail. The first operating member 18 is a trigger lever that is held in the rest position by the biasing elements 68 and 84. As mentioned above, the first operating member 18 pivots around the first pivot axis A1 to operate the hydraulic unit 14 and around the second pivot axis A2 to operate the shift unit 16. As seen in FIG. 7, the first pivot axis A1 is disposed between the shift unit 16 and the coupling portion 26. Also the first pivot axis A1 is disposed between the shift unit 16 and the hydraulic unit 14.

As seen in FIGS. 14 and 15, the first operating member 18 has a mounting portion 18a and a distal free end portion 18b. The mounting portion 18a has the first pivot axis A1. The distal free end portion 18b is spaced apart from the base member 12. The first pivot axis A1 is located on a first side of the center longitudinal axis A5 of the hydraulic unit 14. The distal free end portion 18b is located on a second side of the center longitudinal axis A5 of the hydraulic unit 14 as viewed in a direction parallel to the first pivot axis A1. The first pivot axis A1 is also arranged such that the longitudinal center axis A5 of the hydraulic unit 14 extends between the first pivot axis A1 and the distal end portion 18b.

The first operating member 18 is pivotally mounted to the attachment member 80 around the first pivot axis A1 via a pivot axle 86. The pivot axle 86 defines the first pivot axis A1. The first pivot axis A1 is disposed between the shift unit 16 and the coupling portion 26 of the base member 12 along the longitudinal center axis A5 or with respect to a longitudinal direction of the cylinder 62. Thus, the first operating member 18 is arranged between the hydraulic unit 14 and the shift unit 16. The first operating member 18 is connected to the piston 64 that is disposed in the hydraulic unit 14 to move the piston 64 as the first operating member 18 is pivoted around the first pivot axis A1. Also since the first operating member 18 is mounted on the attachment member 80, the first operating member 18 pivots with the attachment member 80 about the second pivot axis A2 to perform a shifting operation.

As seen in FIGS. 7, 14 and 15, the second operating member 20 is pivotally, mounted on the first operating member 18 around the third pivot axis A3. In particular, the second operating member 20 is mounted to the first operating member 18 by a pivot axle 90. The pivot axle 90 defines the third pivot axis A3, which is coaxial with the second pivot axis A2. The second operating member 20 has an actuating part 20a. The actuating part 20a is arranged to contact the second input member 36 of the shift unit 16 (FIG. 16) as the second operating member 20 pivots from the rest position to the operated position about the third pivot axis A3. Thus, the second operating member 20 causes the cable take-up member 38 to rotate in the second (cable releasing) direction D2 in response to the operation of the second operating member 20.

A biasing element 92 is operatively disposed between the first and second operating members 18 and 20 to bias the second operating member 20 towards its rest position against the first operating member 18. Here, the biasing element 92 is a torsion spring with a first end disposed in a hole in the first operating member 18 and a second end hooked onto the second operating member 20. The biasing element 92 biases the second operating member 20 against the first operating member 18 to establish the rest position of the second operating member 20. In this way, the attachment member 80 supports the first and second operating members 18 and 20 to the base member 12.

Figure 17:
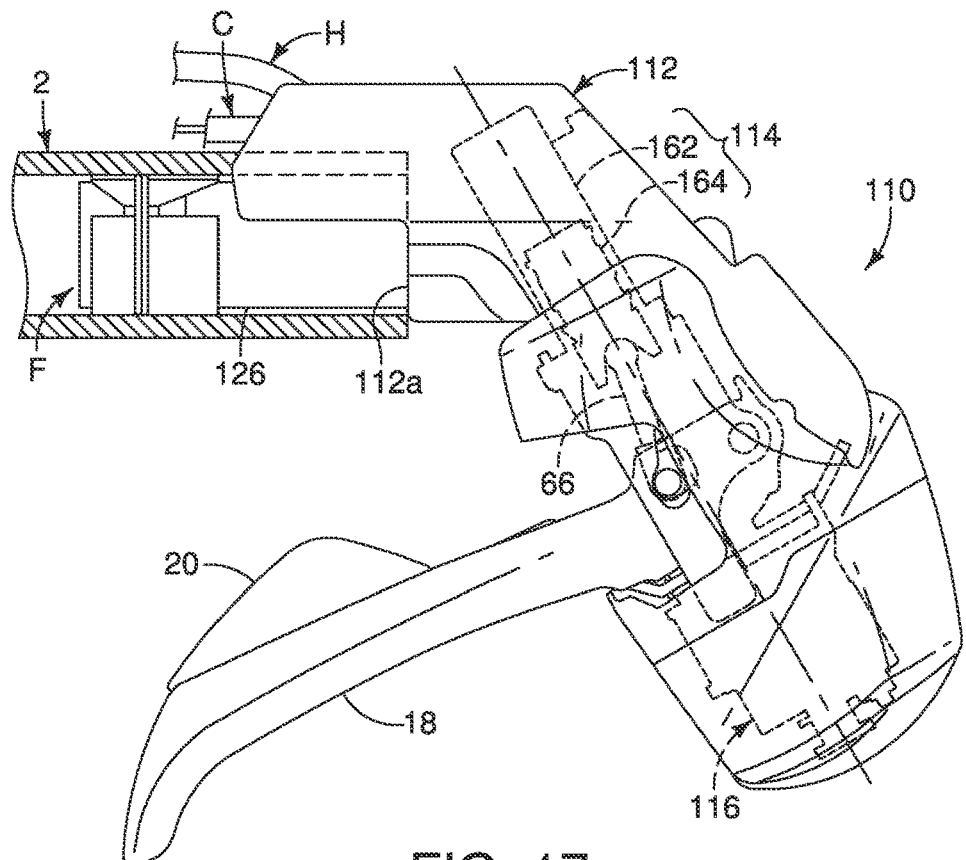
FIG. 17 is an outside elevational view of a right bicycle hydraulic operating device in accordance with a second embodiment with first and second operating members in their rest (non-operated) positions.
Figure 18:
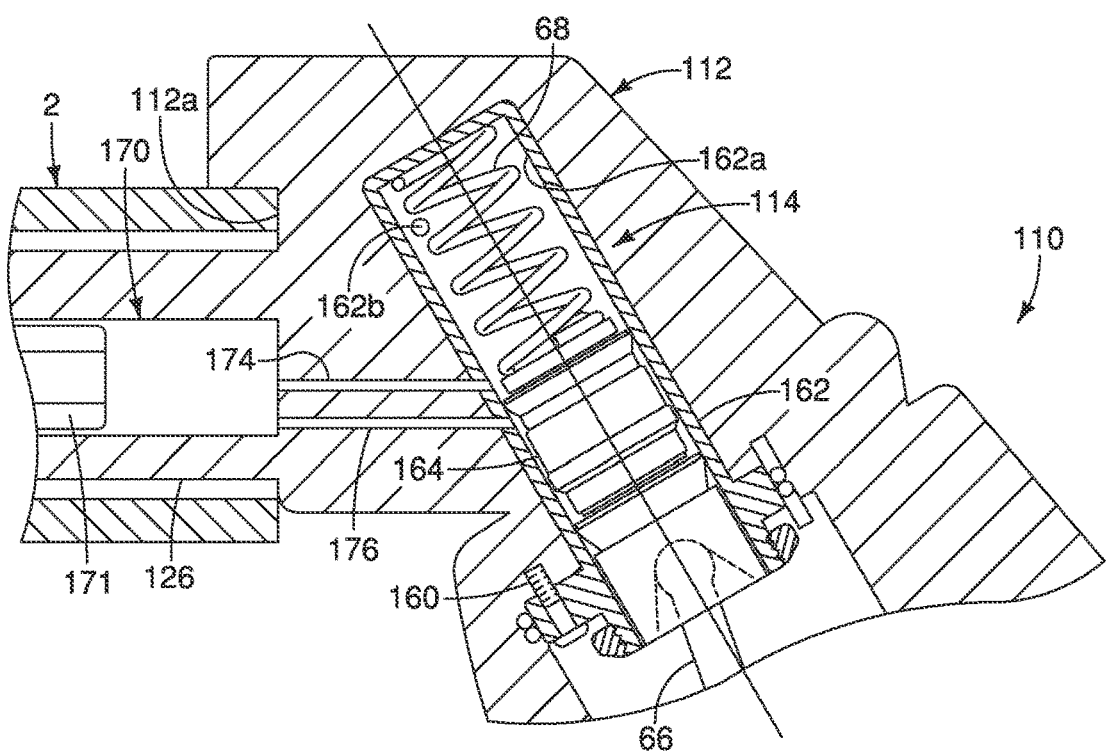
FIG. 18 is a partial cross sectional view of selected parts of the right bicycle hydraulic operating device illustrated in FIG. 17.
Figure 19:
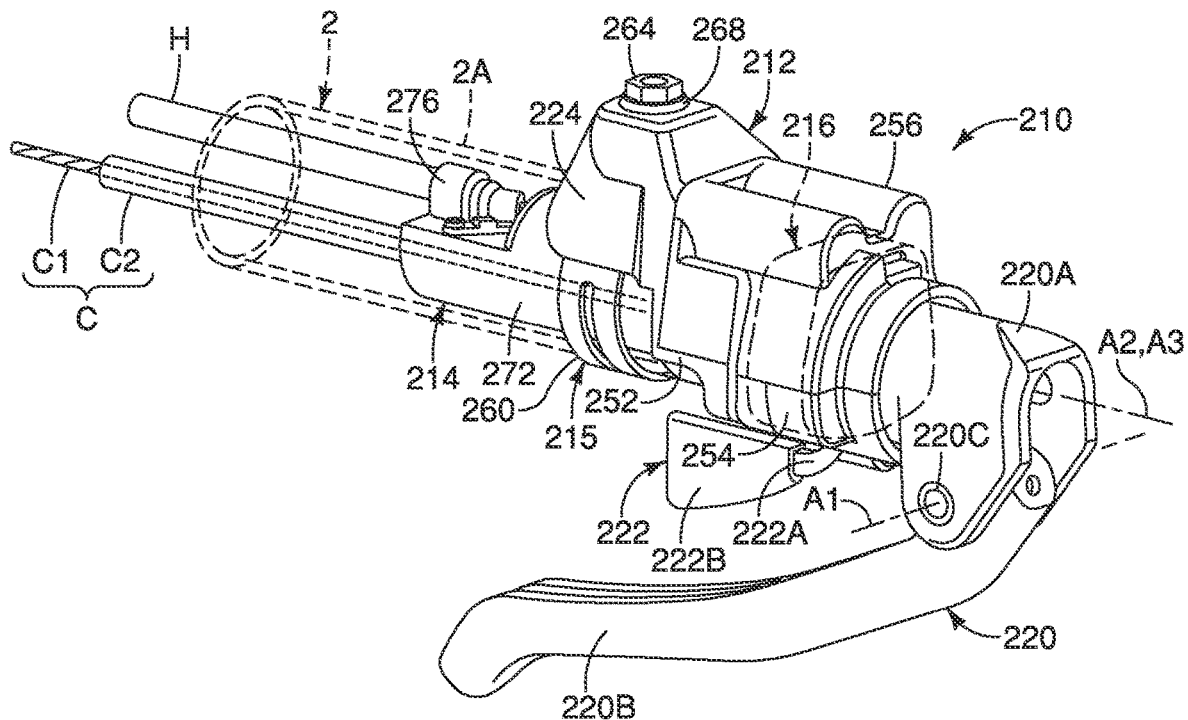
FIG. 19 is an outside perspective view of a right bicycle hydraulic operating device in accordance with a third embodiment in which the bicycle hydraulic operating device is attached to the right free end of the handlebar illustrated in FIG. 1, with the right free end of the handlebar shown in broken lines to better illustrate a control cable and a hydraulic hose that are disposed inside the handlebar.

Referring now to FIGS. 17 and 18, a right bar-end type bicycle hydraulic operating device 110 is illustrated in accordance with a second embodiment. In view of the similarities between the first and second embodiments, the parts of the first and second embodiments that are identical will not be described again with respect to the second embodiment for the sake of brevity. In the second embodiment, the bar-end type bicycle hydraulic operating device (hereinafter "operating device") 110 comprises a base member 112 and a hydraulic unit 114. Here, the base member 112 is configured to be mounted on a handlebar 2 by the fixing structure F in the same manner as the first embodiment as discussed above. The base member 112 has an abutment 112a that is configured to contact an end of the handlebar 2. The hydraulic unit 114 is provided on the base member 112. Similar to the first embodiment, the hydraulic unit 114 is operatively coupled to the hydraulic brake device (not shown) via the hydraulic hose H. In the second embodiment, the hydraulic unit 114 is partially disposed inside the handlebar 2 as explained below. Otherwise, the hydraulic unit 114 is identical to the hydraulic unit 14 of the first embodiment.

In the second embodiment, the operating device 110 further comprises a shift unit 116, which is identical to the shift unit 16 of the first embodiment. Similar to the first embodiment, the shift unit 116 is operatively coupled to the shifting device (not shown) via the control cable C. Alternatively, it will be apparent from this disclosure that the operating device 110 can have only the hydraulic unit 114, which can be used to operate any bicycle hydraulic component as needed and/or desired.

Now, as seen in FIG. 18, the configuration of the hydraulic unit 114 will be discussed. Here, the hydraulic unit 114 is partially disposed in a handlebar coupling portion 126 of the base member 112. In the second embodiment, the hydraulic unit 114 is detachably mounted to the base member 112 by a screw 160. Here, the hydraulic unit 114 includes a hydraulic cylinder 162 that has a cylinder bore 162a and a piston 164 that is movably disposed in the cylinder bore 162a. The hydraulic cylinder 162 has a fluid outlet 162b that is fluidly connected to the hydraulic hose H such that hydraulic fluid flows to and from the hydraulic braking device (not shown) in response to movement of the piston 164 by the first operating member 18. The hydraulic cylinder 162 is disposed outside the handlebar 2 in the state where the base member 112 is mounted to the handlebar 2.

As seen in FIG. 18, the hydraulic unit 114 includes a reservoir 170 fluidly communicating with the cylinder bore 162a. Here, the reservoir 170 is formed in the handlebar coupling portion 126. In this way, the reservoir 170 is at least partially disposed inside the handlebar 2 in the state where the base member 112 is mounted to the handlebar 2. The reservoir 170 preferably includes a diaphragm 171. The base member 12 includes a fluid passage 174 connecting the cylinder bore 162a and the reservoir 170. In this way, the reservoir 170 fluidly communicates with the hydraulic chamber of the cylinder bore 162a of the hydraulic cylinder 162 via the fluid passage 174 while the first operating member 18 is in a rest position. The base member 112 includes a fluid passage 176 connecting the cylinder bore 162a and the reservoir 170 for lubricating the piston 164.

Referring now to FIGS. 19 to 31, a right bar-end type bicycle hydraulic operating device 210 is illustrated in accordance with a third embodiment. Similar to the prior discussed embodiments, the bar-end type bicycle hydraulic operating device 210 includes both a braking function and a shifting function in a single unit that is mounted to the bicycle. In the third embodiment, the bar-end type bicycle hydraulic operating device (hereinafter "operating device") 210 comprises a base member 212 and a hydraulic unit 214. Here, the base member 212 is configured to be mounted on a handlebar 2. In particular, the base member 212 includes an external handlebar fixing structure 215 that is configured to contact an external, or radially outermost, surface 2A of the handlebar 2. The base member 212 has an abutment 112A that is configured to contact an end of the handlebar 2. The hydraulic unit 214 is provided on the base member 212. In the third embodiment, the hydraulic unit 214 is partially disposed inside the handlebar 2 in the state where the base member 212 is mounted to the handlebar 2 as explained below.

Referring to FIGS. 19 to 29, the operating device 210 further comprises a shift unit or additional unit 216 that is mounted on the base member 212. The shift unit 216 is supported on the handlebar 2 by the external handlebar fixing structure 215 via the base member 212. Alternatively, it will be apparent from this disclosure that the operating device 210 can have only the hydraulic unit 214, which can be used to operate any bicycle hydraulic component as needed and/or desired.

In the third embodiment, the operating device 210 further includes a first operating member 220 and a second operating member 222. The first and second operating members 220 and 222 are both used to operate the shift unit 216 as explained below. The first operating member 220 is also used to operate the hydraulic unit 214 as explained below. Depending on the configuration of the shift unit 216, the second operating member 222 can be omitted so that the shift unit 216 is solely operated by the first operating member 220.

Figure 23:
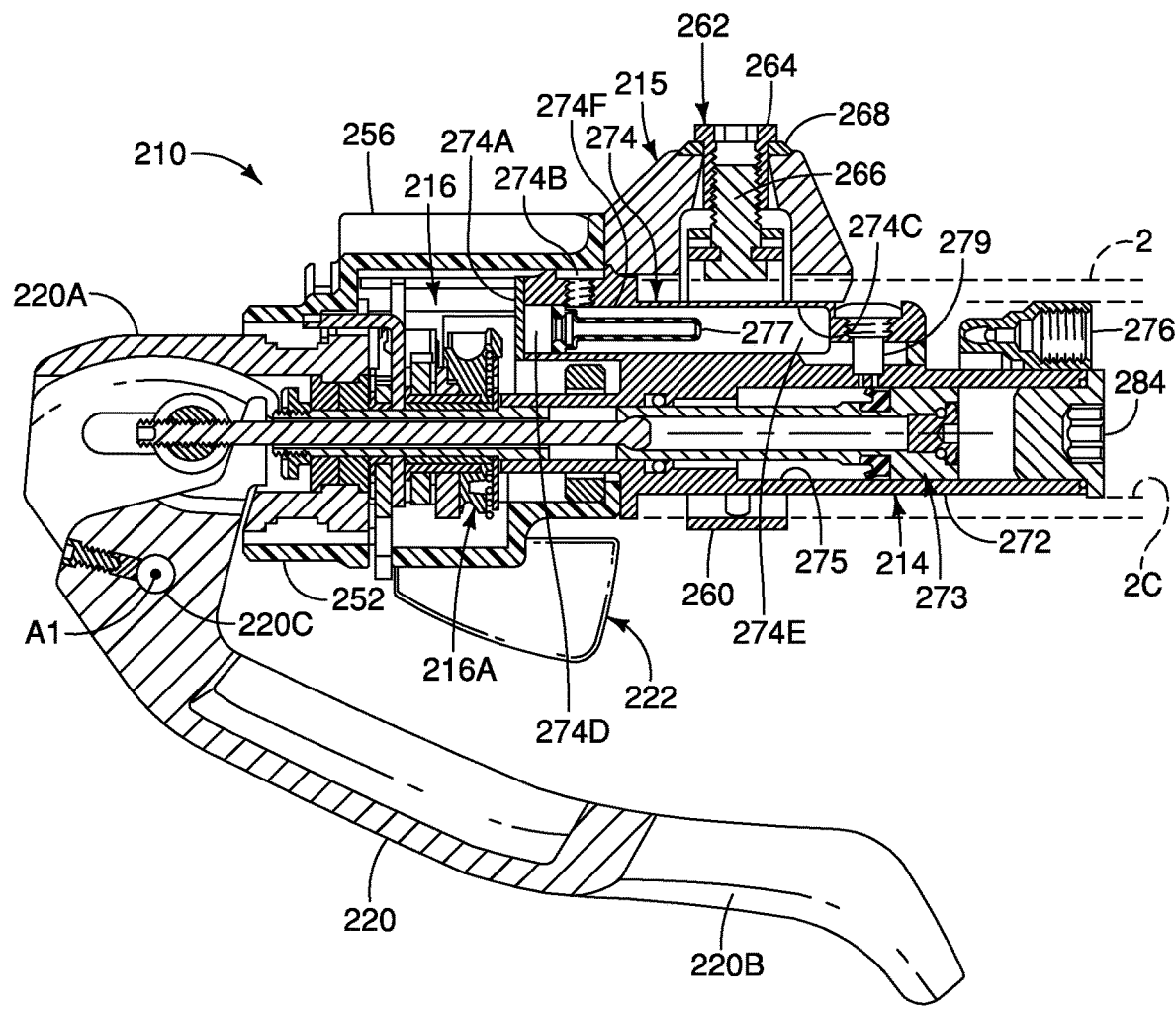
FIG. 23 is a center longitudinal cross sectional view of the right bicycle hydraulic operating device illustrated in FIGS. 19 and 20 with the first and second operating members in their rest positions.
Figure 24:
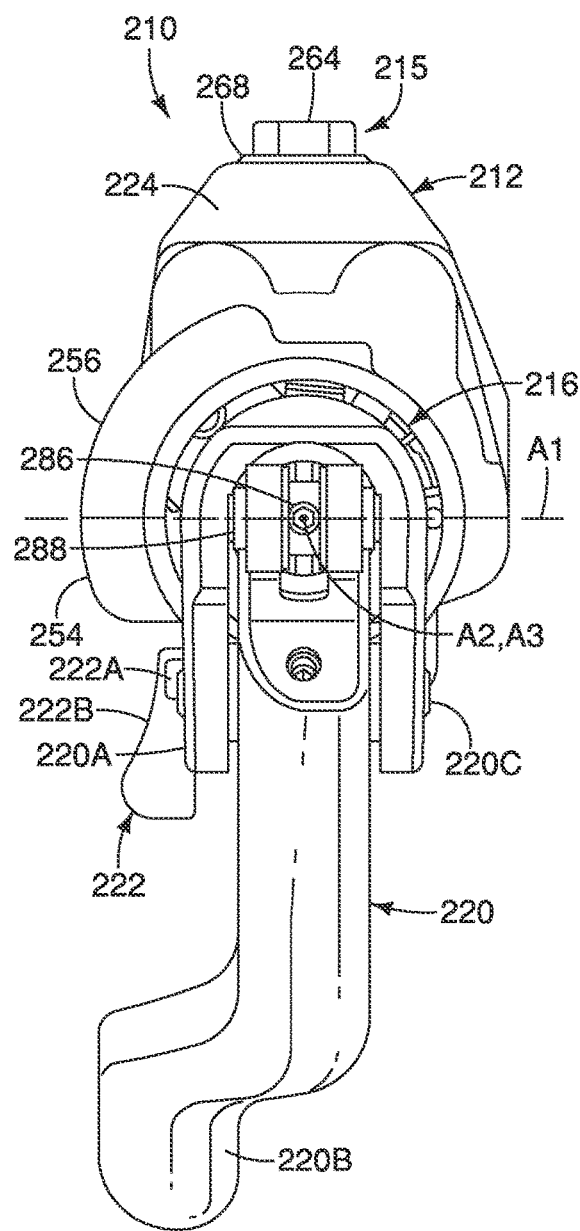
FIG. 24 is a front end elevational view of the right bicycle hydraulic operating device illustrated in FIGS. 19 to 23, with the first and second operating members in their rest positions.
Figure 25:
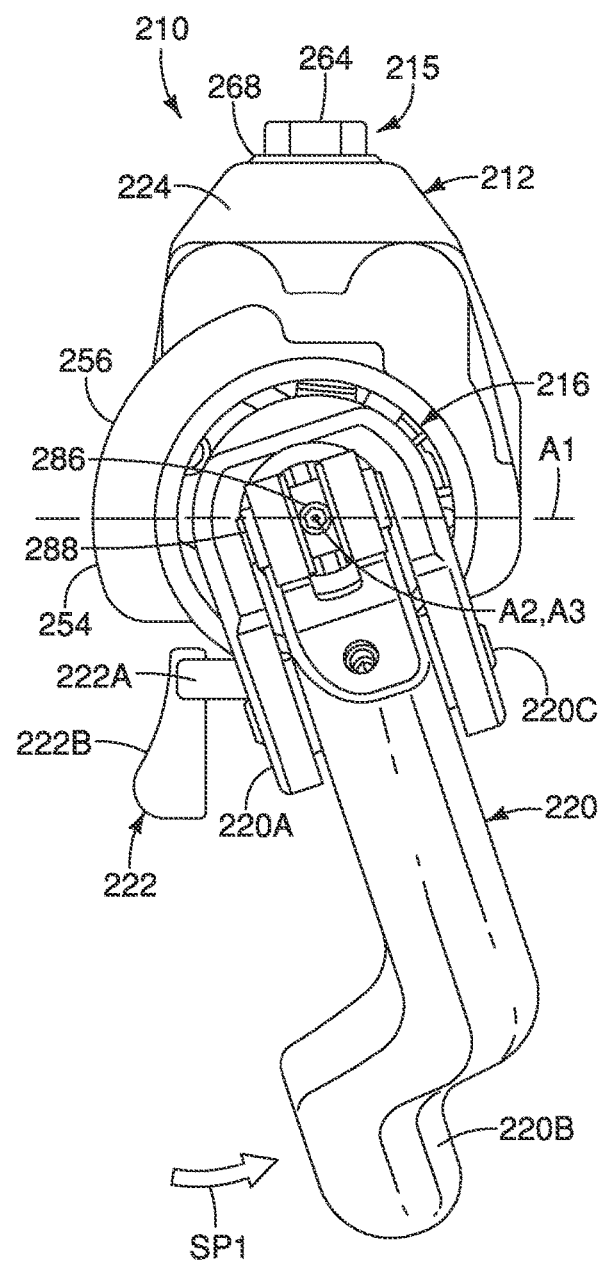
FIG. 25 is a front end elevational view, similar to FIG. 24, of the right bicycle hydraulic operating device, but with the first operating member in an operated position to operate the additional (shift) operating unit and the second operating member in the rest position.
Figure 26:
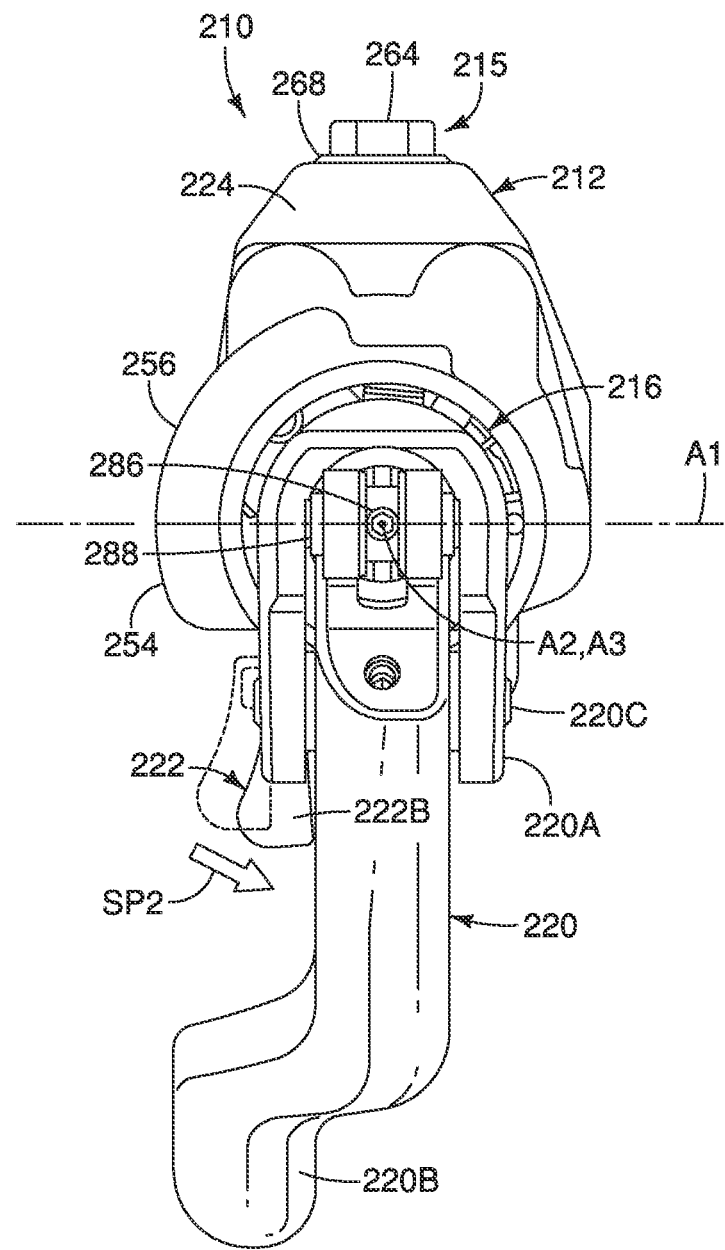
FIG. 26 is a front end elevational view, similar to FIGS. 24 and 25, of the right bicycle hydraulic operating device, but with the second operating member in an operated position and the first operating member in the rest position.

Also as explained below, the first and second operating members 220 and 222 are trigger levers that are biased to their rest positions such that they automatically return to the their rest position upon being released from an operated position. FIGS. 19 to 21, 23, 24 and 27 illustrate the operating device 210 with its various parts in their rest positions, while FIGS. 22, 25 and 26 illustrate the operating device 210 with selected parts held in operated positions.

Figure 21:
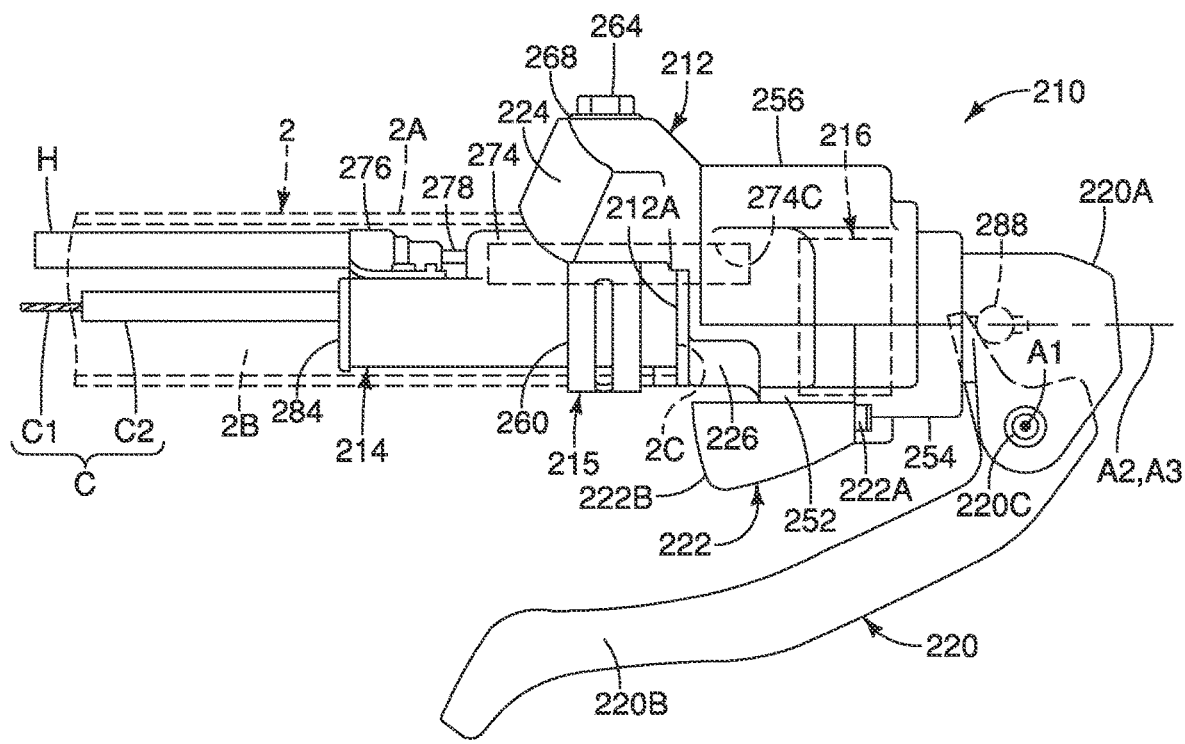
FIG. 21 is an outside end elevational view of the right bicycle hydraulic operating device illustrated in FIGS. 19 and 20, with first and second operating members in their rest positions.
Figure 22:
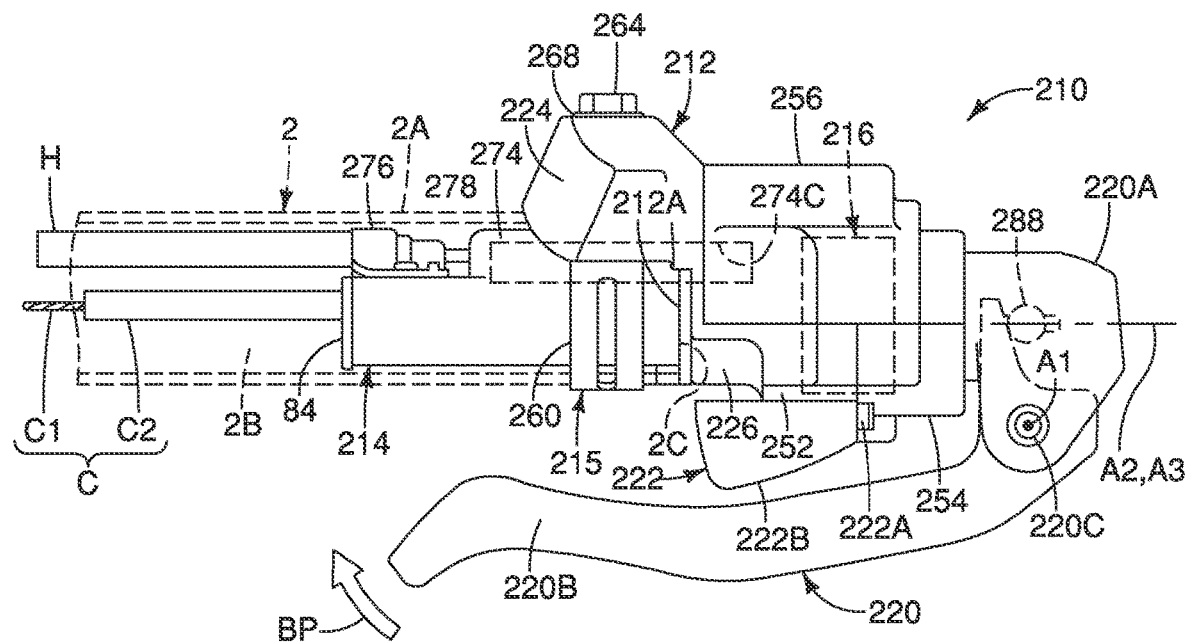
FIG. 22 is an outside end elevational view, similar to FIG. 21, of the right bicycle hydraulic operating device, but with the first operating member in an operated position to perform a braking operation and the second operating member in the rest position.

As seen in FIGS. 21 and 22, the first operating member 220 basically includes a rotational member 220A, a lever member 220B and a pivot pin 220C. The lever member 220B is pivotally mounted to the rotational member 220A by the pivot pin 220C. Thus, the first operating member 220 is pivotally mounted relative to the base member 212 around a first pivot axis A1 to actuate the hydraulic unit 214. The first pivot axis A1 is defined by the pivot pin 220C. As seen in FIGS. 24 and 25, the first operating member 220 is also configured to be pivoted around a second pivot axis A2 to actuate the shift unit 216. The second pivot axis A2 is different from the first pivot axis A1. In particular, the rotational member 220A is coupled to the shift unit 216 to pivot about the second pivot axis A2. In the third embodiment, the second pivot axis A2 is arranged perpendicular to the first pivot axis A1. Typically, as in the case of the third embodiment, the rotational member 220A has a pulling member mounted thereon for rotating a cable take-up member 216A (FIGS. 23 and 29) of the shift unit 216 in a first direction around the second pivot axis A2.

With this configuration, the first operating member 220 is configured to perform a braking operation when moved along a braking path BP (FIG. 22) generally parallel to a center longitudinal plane of the bicycle, and a cable pulling operation when moved along a first shifting path SP1 (FIG.

25) towards the center longitudinal plane of the bicycle. The shift unit 216 remains stationary (i.e., not actuated) as the first operating member 220 pivots with respect to the base member 212 around the first pivot axis A1 to perform the braking operation.

As seen in FIG. 25, the second operating member 222 basically includes a base portion 222A and a lever member 222B. The base portion 222A is pivotally mounted to the shift unit 216. Specifically, in the third embodiment, the second operating member 222 is pivotally mounted relative to the base member 212 around a third pivot axis A3 to actuate the shift unit 216. In the third embodiment, the second and third pivot axes A2 and A3 are coaxially arranged. With this configuration, the second operating member 222 is configured to perform a cable releasing operation when moved along a second shifting path SP2 (FIG. 26) towards the center longitudinal plane of the bicycle. As a result of the operation of the second operating member 222, the cable take-up member 216A (FIGS. 23 and 29) of the shift unit 216 is rotated in a second direction around the second and third pivot axes A2 and A3.

Figure 29:
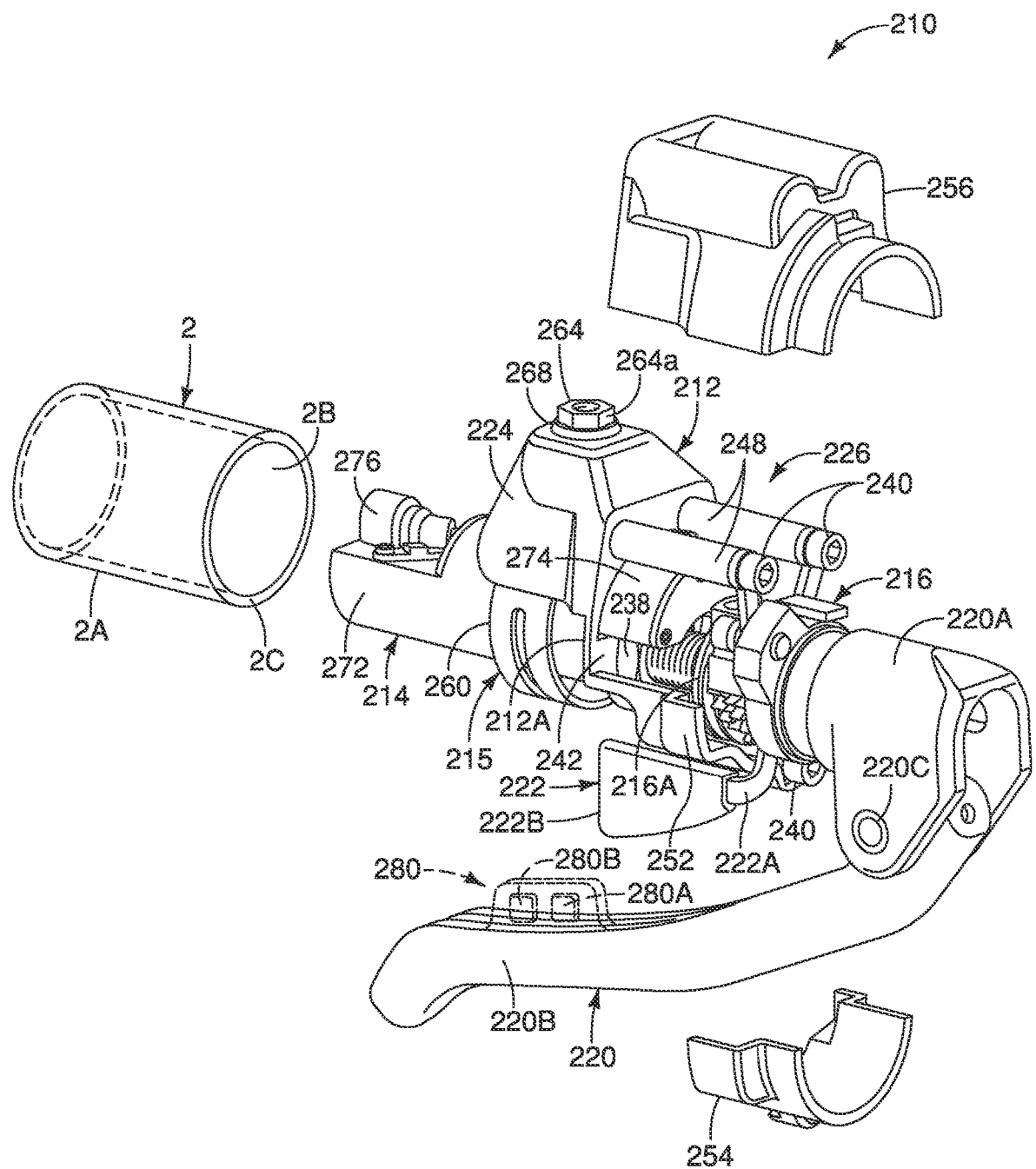
FIG. 29 is a partially exploded perspective view of the right bicycle hydraulic operating device illustrated in FIGS. 19 to 28.

It will be apparent to those skilled in the bicycle field from this disclosure that the operating units of the operating device 210 are not limited to the illustrated embodiment. For example, one or both of the operating units could be an electric operating unit. As shown in FIG. 29 with broken (dashed) lines, the bar-end type hydraulic operating device 210 can include an additional unit 280. The additional unit includes electric switches 280A and 280B. The electric switches 280A and 280B are mounted on the operating member 220. In the case that the electric switches 280A and 280B are used for operating an electric shifting device, the shift unit 216 can be omitted. Further, the number of the electric switch is not limited to two and is freely chosen as needed and/or desired. Moreover, the operating units of the operating device 210 are not limited to being used for operating a brake device and a shifting device.

Figure 30:
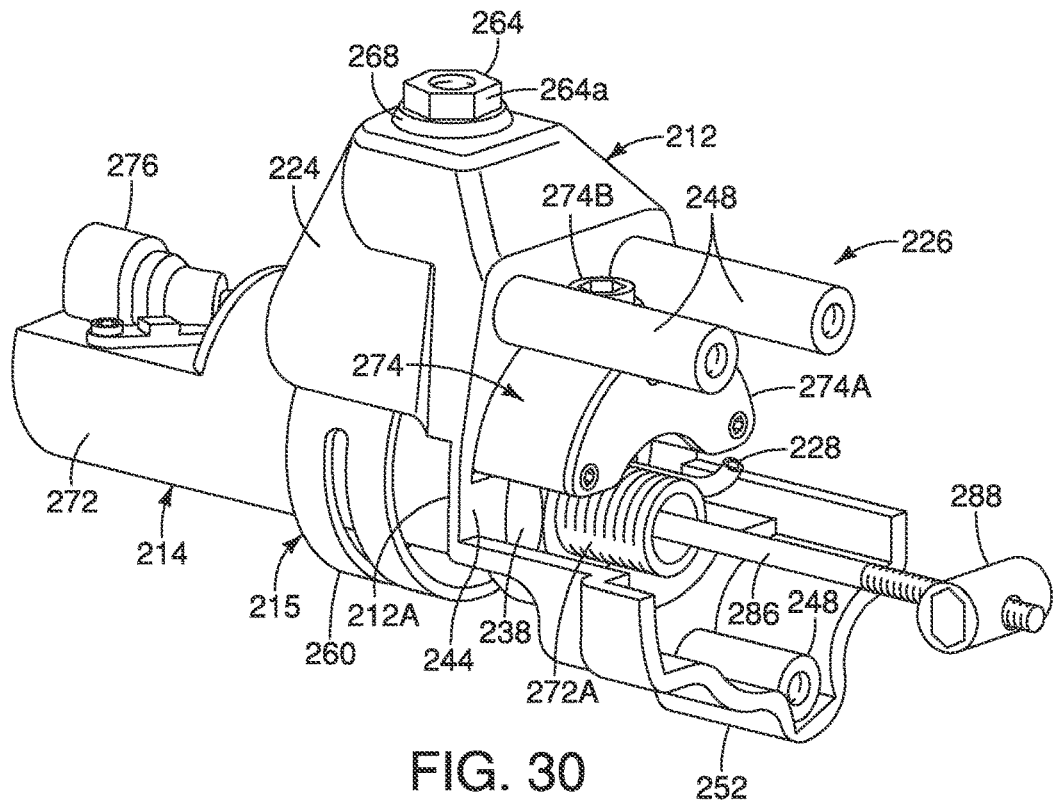
FIG. 30 is a perspective view of selected parts the right bicycle hydraulic operating device illustrated in FIGS. 19 to 28.
Figure 31:
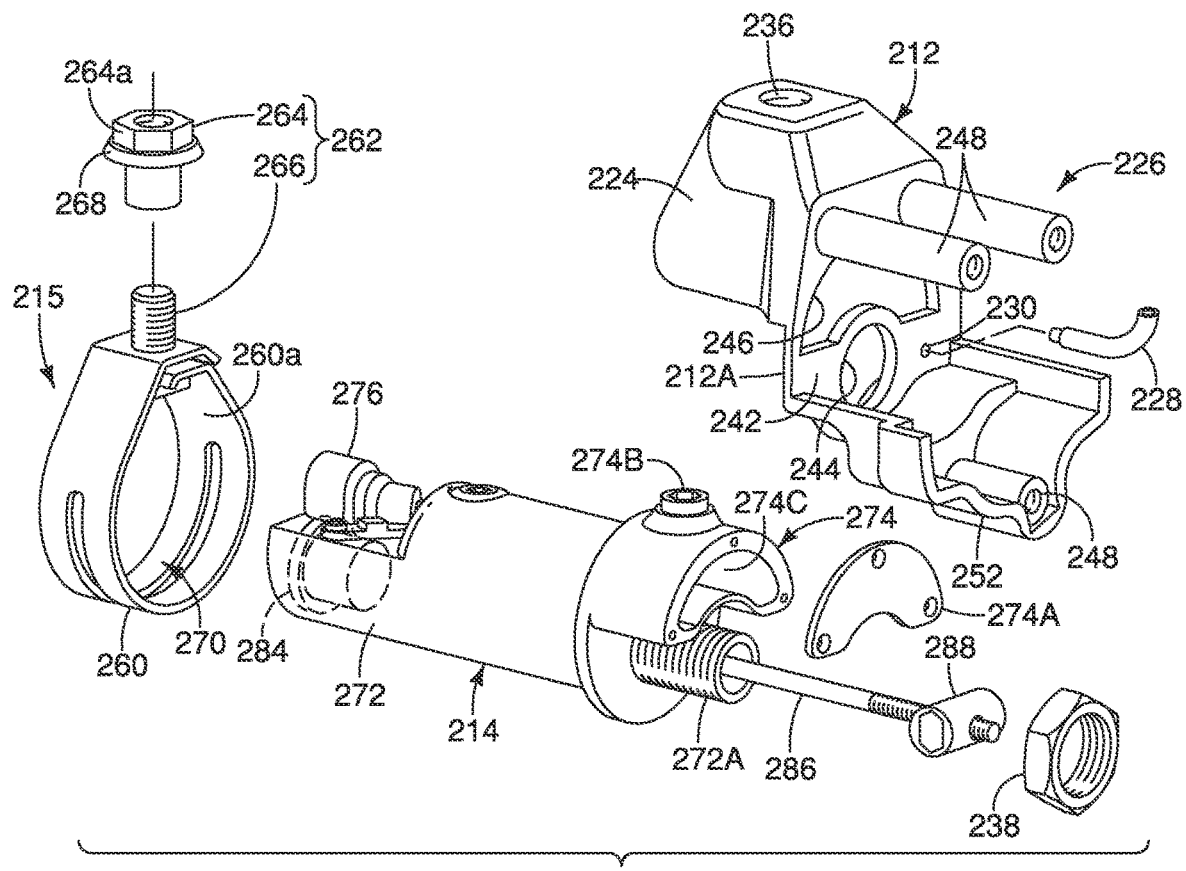
FIG. 31 is a partially exploded perspective view of the selected parts of the right bicycle hydraulic operating device illustrated in FIG. 30.

Now, the base member 212 will be discussed in more detail with primary reference to FIGS. 20 and 27 to 31. Basically, the base member 212 is fastened onto an exterior surface 2A of the handlebar 2 by the external handlebar fixing structure 215. The base member 212 and the external handlebar fixing structure 215 do not extend into an interior 2B of the handlebar 2. The base member 212 basically includes a first (handlebar) attachment portion 224 and a second (operating unit) attachment portion 226. Here, the first and second attachment portions 224 and 226 are integrally formed together as a single or one-piece member from a suitable material such as a hard, rigid plastic or a metal. The external handlebar fixing structure 215 and the hydraulic unit 214 are supported by the first attachment portion 224, while the shift unit 216 is supported by the second attachment portion 226. In the third embodiment, as seen in FIGS. 30 and 31, the base member 212 includes a guiding structure 228 that directs a cable (the inner cable C1) extending from the shift unit 216 to inside the handlebar 2 in a state where the operating device 210 is mounted to the handlebar 2. In the third embodiment, the guiding structure 228 is a curved tube that is press-fitted into a hole 230 of the first attachment portion 224. However, the guiding structure is not limited to the illustrated guiding structure. For example, depending on the configuration of the shift unit 216, the guiding structure 228 could be omitted such that the hole 230 of the first attachment portion 224 constitutes the guiding structure.

Figure 20:
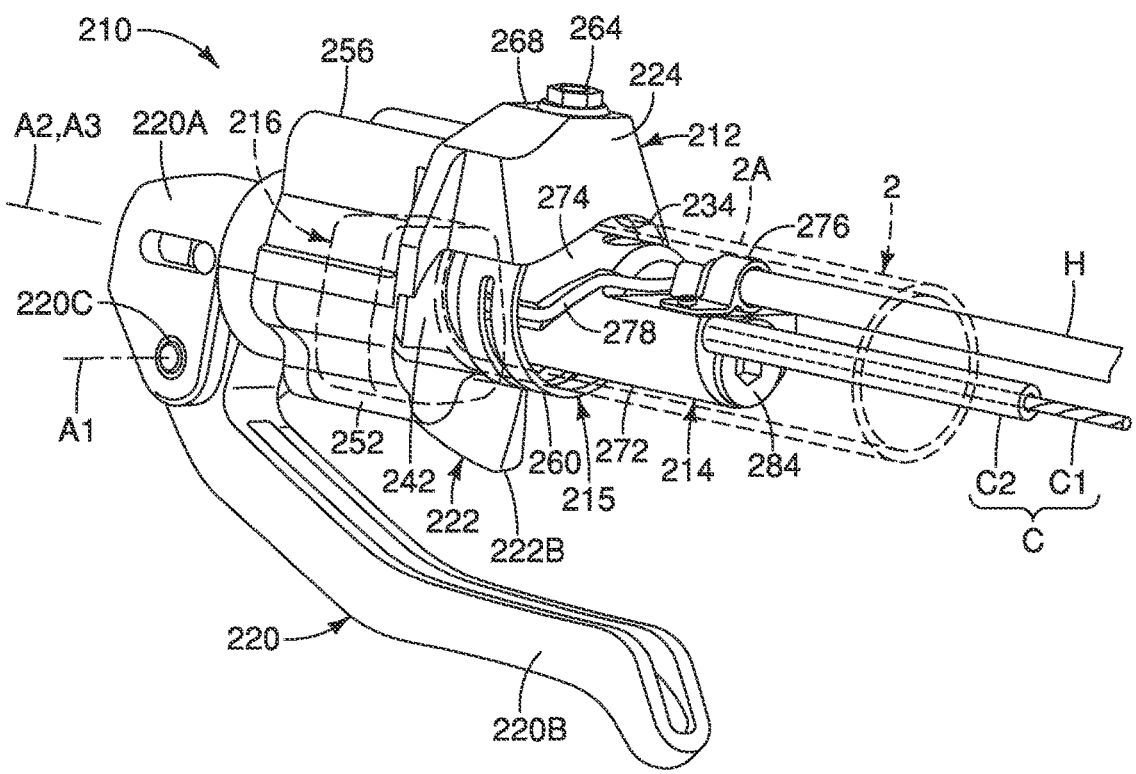
FIG. 20 is an inside perspective view of the right bicycle hydraulic operating device illustrated in FIG. 19, with the right free end of the handlebar shown in broken lines to better illustrate the control cable and the hydraulic hose that are disposed inside the handlebar.

In the third embodiment, as seen in FIGS. 20, 27 and 28, the first attachment portion 224 has a handlebar contact surface 234 that contacts the exterior surface 2A of the handlebar 2. In particular, as the external handlebar fixing structure 215 is tightened, the handlebar contact surface 234 drawn into contact with the exterior surface 2A by the handlebar contact surface 234 that contacts the exterior surface 2A. In the third embodiment, as seen in FIG. 31, the first attachment portion 224 has a mounting opening 236 for attaching the external handlebar fixing structure 215 thereto.

In the third embodiment, as seen in FIGS. 30 and 31, the hydraulic unit 214 is removably attached to the first attachment portion 224 by a nut 238 (FIG. 30). The shift unit 216 is removably attached to the second attachment portion 226 by three screws 240 (FIG. 29). As seen in FIG. 31, the first attachment portion 224 further includes a wall portion 242 having a first opening 244 and a second opening 246. The first and second openings 244 and 246 are configured to accommodate portions of the hydraulic unit 214 therethrough when the hydraulic unit 214 is mounted to the wall portion 242 of the second attachment portion 224 using the nut 238. As seen in FIGS. 29 and 30, the second attachment portion 226 includes three fastener mounting posts 248 that the screws 240 are screwed into for securing the shift unit 216. The wall portion 242 of the first attachment portion 224 of the base member 212 forms the abutment 212A that is configured to contact an end, or free axial end, 2C of the handlebar 2 in a state where the operating device 210 is mounted to the handlebar 2. The abutment 212A is defined on the wall portion 242 at an opposite side with respect to the fastener mounting posts 248. Thus, the operating device 210 is a bar-end operating device, which means that the operating device 210 is configured to be mounted to a free end of a handlebar and protrude outwardly in an axial direction from the free end of the handlebar.

In the third embodiment, the first attachment portion 224 further includes an integrated cover portion 252 that is integrally formed with the other portions of base member 212 as a single or one-piece member. As seen in FIGS. 19, 20, 23 and 29, a lower cover portion 254 and an upper cover portion 256 are snap-fitted to the base member 212 for substantially concealing the shift unit 216.

Now, the external handlebar fixing structure 215 will be discussed in more detail with primary reference to FIGS. 19, 20, 30 and 31. Basically, the external handlebar fixing structure 215 is configured to contact the external surface 2A of the handlebar 2 in a state where the operating device 210 is mounted to the handlebar 2. More specifically, the external handlebar fixing structure 215 includes a handlebar engagement member 260 and a tightening structure 262. The tightening structure 262 displaces the handlebar engagement member 260 towards the base member 212 to clamp the handlebar 2 between the base member 212 and the handlebar engagement member 260 in response to tightening of the tightening structure 262.

The tightening structure 262 includes an operated member 264, which is a member that is operated by a user to tighten or loose the tightening structure 262 to displace the handlebar engagement member 260 with respect to the base member 212. In the third embodiment, the tightening structure 262 includes a fixing bolt 266 that is mounted to the handlebar engagement member 260. The fixing bolt 266 threadedly engages the operated member 264, which is a nut in the third embodiment. In this way, in the third embodiment, the operated member 264 is configured to be coupled to the handlebar engagement member 260. Thus, in the third embodiment, the external handlebar fixing structure 215 includes a band as the handlebar engagement member 260, and the operated member 264 and the fixing bolt 266 as the tightening structure 262. In the third embodiment, a washer 268 is optionally provided on the operated member 264 (i.e., a nut).

The operated member 264 is configured to be disposed opposite to the first operating member 220 with respect to the base member 212. The operated member 264 has a tool access portion 264a, which is provided on an external surface of the operated member 264. The operated member 264 is configured to displace the band 260 with respect to the base member 212 so as to clamp the handlebar 2 between the base member 212 and the band 260 in response to operation of the operated member 264. In this way, the operated member 264 can be easily tightened or loosened.

The band or handlebar engagement member 260 of the external handlebar fixing structure 215 defines a handlebar receiving opening 270 together with the first attachment portion 224 of the base member 212 tier receiving the handlebar 2 therethrough. In particular, in the third embodiment, the band or handlebar engagement member 260 has an inner surface 260a that defines the handlebar receiving opening 270 together with the handlebar contact surface 234 of the first attachment portion 224. The band or handlebar engagement member 260 is a metal band. The band or handlebar engagement member 260 has its ends held together by the fixing bolt 266, which threadedly engages the operated member 264. Basically, the tightening structure 262 is configured to displace the band 260 with respect to the base member 212 by turning the operated member 264 using the tool access portion 264a to clamp the handlebar 2 between the base member 212 and the band 260 in response to adjustment of the tightening structure 262.

Now, the hydraulic unit 214 will be discussed in more detail with primary reference to FIGS. 30 and 31. Basically, the hydraulic unit 214 includes a hydraulic cylinder 272, a piston 273 and a reservoir 274. The hydraulic cylinder 272 has a cylinder bore 275. The piston 273 is movably disposed in the cylinder bore 275. The hydraulic cylinder 272 extends through the handlebar receiving opening 270. Thus, the hydraulic cylinder 272 is at least partially disposed inside the handlebar 2 in the state where the base member 212 is mounted to the handlebar 2. The hydraulic cylinder 272 has a tubular shaft 272A with an external thread that the nut 238 is screwed onto for securing the hydraulic cylinder 272 to the base member 212. The hydraulic cylinder 272 further has a cable passage 272B extending through the wall portion 242. The cable passage 272B aligns with the guiding structure 228 so as to guide the inner cable C1 that extends from the shift operating unit 216 to inside the handlebar 2 in a state where the bicycle operating device 210 is mounted to the handlebar 2.

The reservoir 274 fluidly communicating with the hydraulic cylinder 272. In the third embodiment, the reservoir 274 is integrally formed with the hydraulic cylinder 272. The reservoir 274 is closed off by a lid 274A. The reservoir 274 has a filler port 274B for adding hydraulic fluid into a reservoir cavity 274C (FIG. 31). The reservoir 274 extends into the interior 2B of the handlebar 2 when the operating device 210 is in the installed state as seen in FIGS. 19, 20, 27 and 28. Thus, the reservoir 274 is at least partially disposed inside the handlebar 2 in the state where the base member 12 is mounted to the handlebar 2. In particular, the reservoir 274 is located entirely in the upper half of the interior 2B of the handlebar 2 when the operating device 210 is in the installed state as seen in FIGS. 27 and 28. Thus, the reservoir 274 extends through the handlebar receiving opening 270. As a result, the reservoir 274 is at least partially located radially inward of the handlebar receiving opening 270. The hydraulic cylinder 272 includes a hydraulic hose inlet 276 that is located radially inward of the handlebar receiving opening 270. Here, the hydraulic hose inlet 276 is a separate member that is fixed to the hydraulic cylinder 272 at a location rearward of the reservoir 274. Thus, as seen in FIGS. 27 and 31, the hydraulic hose inlet 276 is located entirely in the upper half of the interior 2B of the handlebar 2 when the operating device 210 is in the installed state. Preferably, a flexible diaphragm 277 is provided in the reservoir 274. The flexible diaphragm 277 defines an air chamber 274D and a fluid chamber 274E in a reservoir tank 274F. The fluid chamber 274E is in fluid communication with the cylinder 272, as shown in FIG. 23. As seen in FIG. 20, a hydraulic tube 278 has one end connected to the hydraulic hose inlet 276. The other end of the hydraulic tube 278 is connected to the cylinder bore 275 (FIGS. 28 and 31) of the hydraulic cylinder 272. As seen in FIG. 23, the reservoir 274 is fluidly connected to the cylinder bore 275 by a fluid passage 279. In this way, the hydraulic fluid in the reservoir 274 is supplied to the hydraulic chamber of the cylinder bore 275 while the first operating member 220 is in a rest position.

As seen in FIG. 23, the piston 273 is movably disposed in the cylinder bore 275 along its longitudinal center axis. The cylinder bore 275 has its longitudinal center axis coaxially arranged with the second and third pivot axes A2 and A3. In the third embodiment, as seen in FIG. 28, the cylinder bore 275 is mostly located in the lower half of the interior 2B of the handlebar 2 when the operating device 210 is in the installed state. Thus, the longitudinal center axis of the cylinder bore 275 is located in the lower half of the interior 2B of the handlebar 2 when the operating device 210 is in the installed state. The hydraulic cylinder 272 has a plug 284 that is threaded into one end of the cylinder bore 275 to close off the end of the cylinder bore 275.

As seen in FIG. 23, a piston rod 286 operatively connects the first operating member 220 to the piston 273 such that pivotal movement of the first operating member 220 around the first pivot axis A1 cause the piston 273 to move from a rest position to an actuated position along the longitudinal center axis of the cylinder bore 275. The first operating member 220 is pivotally connected to a first end of the piston rod 286 by a pivot pin 288. The piston rod 286 has a second end fixed to the piston 273. In this way, the piston rod 286 pulls the piston 273 as the first operating member 220 is pivoted from the rest position to the operated position.

Now, the shift unit 216 will be discussed detail with primary reference to FIGS. 23 and 29. Basically, the shift unit 216 is constructed as a mechanical shift unit that is configured to pull and release the inner cable C1 of the control cable C to operate the shifting device. The shift unit 216 pulls or releases the inner cable C1 in response to operation of the first and second operating members 220 and 222. Here, in the third embodiment, the operation of the first operating member 220 cause the shift unit 216 to pull the inner cable C1, while the operation of the second operating member 222 cause the shift unit 216 to release the inner cable C1. Since the structure of the shift unit 216 can be practically any type of mechanical shift unit 216 as needed and/or desired, the shift unit 216 will not be discussed or illustrated in detail herein.

The shift unit 216 can pull and release the inner cable C1 in response to operation of the first and second operating members 220 and 222 in the same manner as the shift operating unit that is described in U.S. Patent Application Publication No. 2012/0297919. However, the mounting of the shift unit 216 to the base member 212 and the arrangement of the first and second operating members 220 and 222 are different from the shift control mechanism disclosed in this U.S. Patent Publication. In other words, the shift control mechanism of this U.S. Patent Publication would need to be adapted to be used with the base member 212 and the hydraulic unit 214.

Of course, the shift unit 216 is not limited to this arrangement in which two operating members are used to operate the shift unit 216. For example, the shift unit 216 can be configured such that first (single) operating member performs a braking operation, a cable pulling operation and a cable releasing operation in the same manner as the shift control mechanism that is described in U.S. Patent Application Publication No. 2010/0083788. Of course, the shift control mechanism would need to be adapted to be used with the base member 212 and the hydraulic unit 214.

Figure 32:
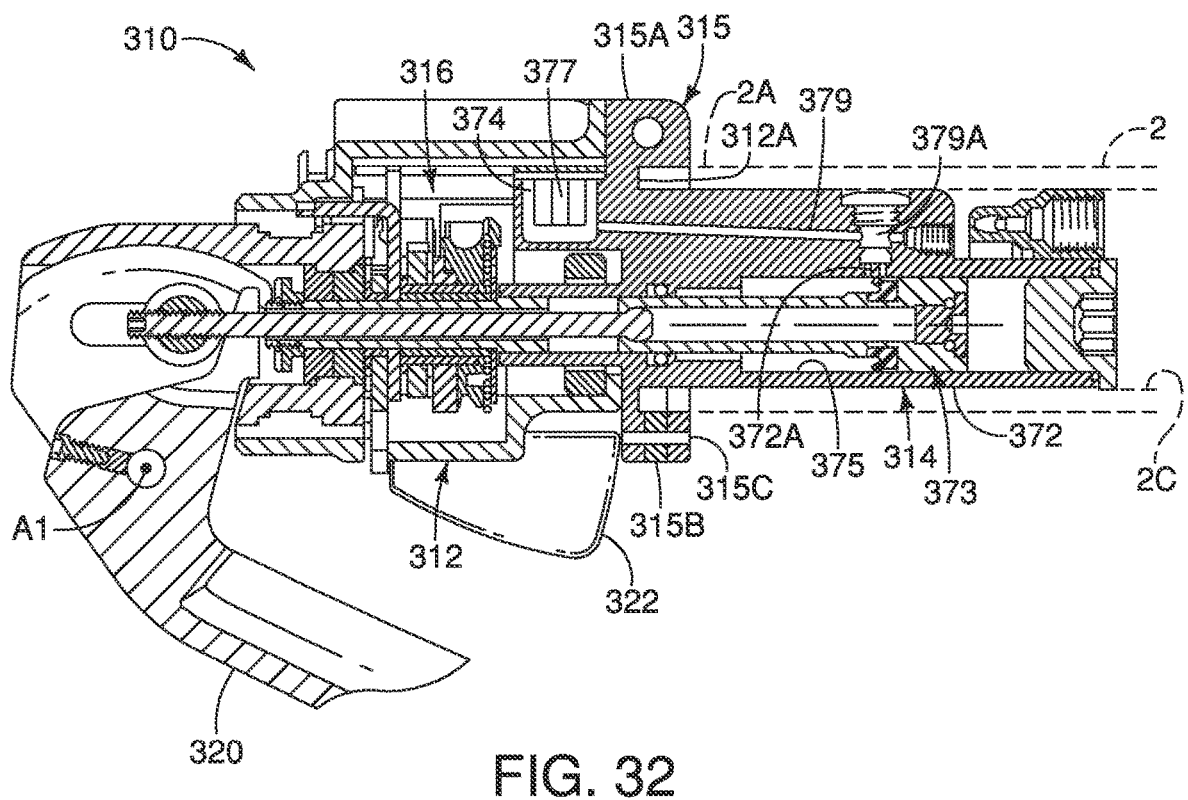
FIG. 32 is a center longitudinal cross sectional view, similar to FIG. 23, of a right bar-end type bicycle hydraulic operating device in accordance with a fourth embodiment in which a reservoir is outside of the handlebar and a hydraulic cylinder is at least partially disposed inside the handlebar in the state where a base member is mounted to the handlebar.

Referring now to FIG. 32, a right bicycle hydraulic operating device 310 is illustrated in accordance with a fourth embodiment. In view of the similarities between the third and fourth embodiments, the parts of the third and fourth embodiments that are identical will not be described again with respect to the fourth embodiment for the sake of brevity. Similar to the prior discussed embodiments, the bar-end type bicycle hydraulic operating device 310 includes both a braking function and a shifting function in a single unit that is mounted to the bicycle. In the fourth embodiment, the bar-end type bicycle hydraulic operating device (hereinafter "operating device") 310 comprises a base member 312 and a hydraulic unit 314. Here, the base member 312 is configured to be mounted on a handlebar 2. In particular, the base member 312 includes an external handlebar fixing structure 315 that is configured to contact an external surface 2A of the handlebar 2. The external handlebar fixing structure 315 includes a first or fixed clamp portion 315A and a second or movable clamp portion 315B. A first end of the movable clamp portion 315B is pivotally attached to a first end of the fixed clamp portion 315A by a pivot pin 315C. A fastener such as a bolt connects second ends of the clamp portions 315A and 315B to vary the size of the handlebar receiving opening. The base member 312 has an abutment 312A that is configured to contact an end of the handlebar 2. The hydraulic unit 314 is provided on the base member 312. In the fourth embodiment, the hydraulic unit 314 is partially disposed inside the handlebar 2 in the state where the base member 312 is mounted to the handlebar 2 as explained below. Similar to the third embodiment, the hydraulic unit 314 is operatively coupled to the hydraulic brake device (not shown) via the hydraulic hose H. In the fourth embodiment, the hydraulic unit 314 is partially disposed inside the handlebar 2 as explained below.

In the fourth embodiment, the operating device 310 further comprises a shift unit 316, which is identical to the shift unit 216 of the third embodiment. Similar to the third embodiment, the shift unit 316 is operatively coupled to the shifting device (not shown) via the control cable C. Alternatively, it will be apparent from this disclosure that the operating device 310 can have only the hydraulic unit 314, which can be used to operate any bicycle hydraulic component as needed and/or desired.

In the fourth embodiment, the operating device 310 further includes a first operating member 320 and a second operating member 322. The first and second operating members 320 and 322 are used to operate the shift unit 316 in the same manner as the third embodiment as discussed above. The first operating member 320 is also used to operate the hydraulic unit 314 in the same manner as the third embodiment as discussed above. Also the first and second operating members 320 and 322 are trigger levers that are biased to their rest positions such that they automatically return to their rest position upon being released from an operated position in the same manner as the third embodiment as discussed above.

Now, the configuration of the hydraulic unit 314 will be discussed. Here, the hydraulic unit 314 is integrally formed with the external handlebar fixing structure 315, Similar to the prior embodiments, the hydraulic unit 314 includes a hydraulic cylinder 372, a piston 373 and a reservoir 374. The hydraulic cylinder 372 has a cylinder bore 375. The piston 373 is movably disposed in the cylinder bore 375. Preferably, the reservoir 374 is provided with a flexible diaphragm 377. The hydraulic cylinder 372 extends through the handlebar receiving opening, Thus, the hydraulic cylinder 372 is at least partially disposed inside the handlebar 2 in the state where the base member 312 is mounted to the handlebar 2. The hydraulic unit 314 is basically the same as the hydraulic unit 214, as discussed above, except that the configuration of the reservoir 374 has been modified and the hydraulic cylinder 372 is integrally formed with the first or fixed clamp portion 315A of the external handlebar fixing structure 315. Thus, in this fourth embodiment, the reservoir 374 is disposed outside the handlebar 2 in the state where the base member 312 is mounted to the handlebar 2. Also with this configuration of the reservoir 374, the base member 312 includes a fluid passage 379 connecting the cylinder bore 375 and the reservoir 374. The fluid passage 379 has a connecting portion 379A contiguous with a port 372A of the hydraulic cylinder 372. The connecting portion 379A extends in a direction transverse to a fluid flow direction between the cylinder bore 375 and the reservoir 374.

Figure 33:
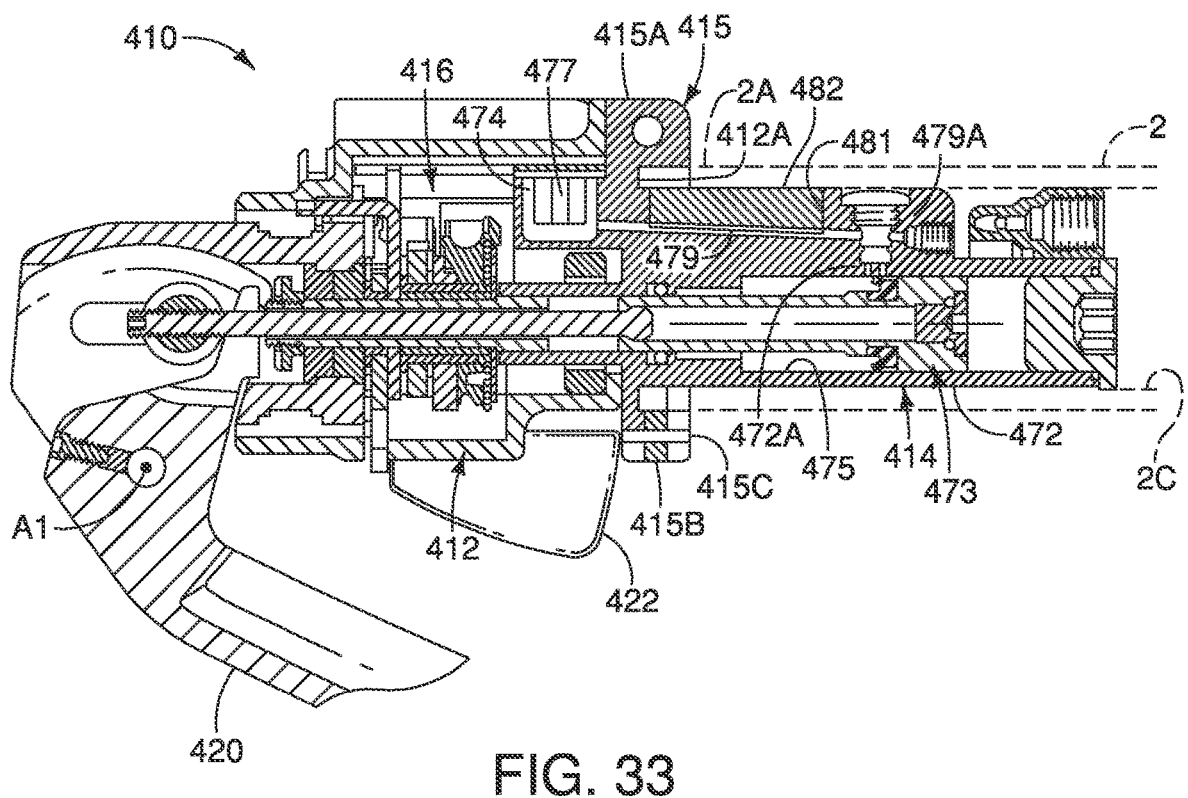
FIG. 33 is a center longitudinal cross sectional view, similar to FIGS. 23 and 32, of a right bar-end type bicycle hydraulic operating device in accordance with a fifth embodiment in which a reservoir is outside of the handlebar and a hydraulic cylinder is at least partially disposed inside the handlebar in the state where a base member is mounted to the handlebar.

Referring now to FIG. 33, a right bicycle hydraulic operating device 410 is illustrated in accordance with a fifth embodiment. In view of the similarities between the third and fifth embodiments, the parts of the third and fifth embodiments that are identical will not be described again with respect to the fifth embodiment for the sake of brevity. Similar to the prior discussed embodiments, the bar-end type bicycle hydraulic operating device 410 includes both a braking function and a shifting function in a single unit that is mounted to the bicycle. In the fifth embodiment, the bar-end type bicycle hydraulic operating device (hereinafter "operating device") 410 comprises a base member 412 and a hydraulic unit 414. Here, the base member 412 is configured to be mounted on a handlebar 2. In particular, the base member 412 includes an external handlebar fixing structure 415 that is configured to contact an external surface 2A of the handlebar 2. The external handlebar fixing structure 415 includes a first or fixed clamp portion 415A and a second or movable clamp portion 415B. A first end of the movable clamp portion 415B is pivotally attached to a first end of the fixed clamp portion 415A by a pivot pin 415C. A fastener such as a bolt connects second ends of the clamp portions 415A and 415B to vary the size of the handlebar receiving opening. The base member 412 has an abutment 412A that is configured to contact an end of the handlebar 2. The hydraulic unit 414 is provided on the base member 412. In the fifth embodiment, the hydraulic unit 414 is partially disposed inside the handlebar 2 in the state where the base member 412 is mounted to the handlebar 2 as explained below. Similar to the third embodiment, the hydraulic unit 414 is operatively coupled to the hydraulic brake device (not shown) via the hydraulic hose H. In the fifth embodiment, the hydraulic unit 414 is partially disposed inside the handlebar 2 as explained below.

In the fifth embodiment, the operating device 410 further comprises a shift unit 416, which is identical to the shift unit 216 of the third embodiment. In the fifth embodiment, the operating device 410 further includes a first operating member 420 and a second operating member 422. The first and second operating members 420 and 422 are used to operate the shift unit 416 in the same manner as the third embodiment as discussed above. The first operating member 420 is also used to operate the hydraulic unit 414 in the same manner as the third embodiment as discussed above. Also the first and second operating members 420 and 422 are trigger levers that are biased to their rest positions such that they automatically return to their rest position upon being released from an operated position in the same manner as the third embodiment as discussed above.

Now, the configuration of the hydraulic unit 414 will be discussed. Here, the hydraulic unit 414 is integrally formed with the external handlebar fixing structure 415. Similar to the prior embodiments, the hydraulic unit 414 includes a hydraulic cylinder 472, a piston 473 and a reservoir 474. The hydraulic cylinder 472 has a cylinder bore 475. The piston 473 is movably disposed in the cylinder bore 475. Preferably, the reservoir 474 is provided with a flexible diaphragm 477. The hydraulic cylinder 472 extends through the handlebar receiving opening. Thus, the hydraulic cylinder 472 is at least partially disposed inside the handlebar 2 in the state where the base member 412 is mounted to the handlebar 2. The hydraulic unit 414 is basically the same as the hydraulic unit 314, as discussed above, except that the configuration of the reservoir 474 has been modified. Thus, in this fifth embodiment, the reservoir 474 is disposed outside the handlebar 2 in the state where the base member 412 is mounted to the handlebar 2. Also with this configuration of the reservoir 474, the base member 412 includes a fluid passage 479 connecting the cylinder bore 475 and the reservoir 474. The fluid passage 479 has a connecting portion 479A contiguous with a port 472A of the hydraulic cylinder 472. The connecting portion 479A extends in a direction transverse to a fluid flow direction between the cylinder bore 475 and the reservoir 474.

Also with this configuration of the reservoir 474, the base member 412 has a recess 481 and a cover 482. The recess 481 is provided between the cylinder bore 475 and the reservoir 474. The cover 482 is configured to cover the recess 481 so as to define a space between the recess 481 and the cover 482. The fluid passage 479 includes the space between the recess 481 and the cover 482. By providing die recess 481 and the cover 482, the fluid passage 479 can be more easily formed in the base member 412.

Figure 34:
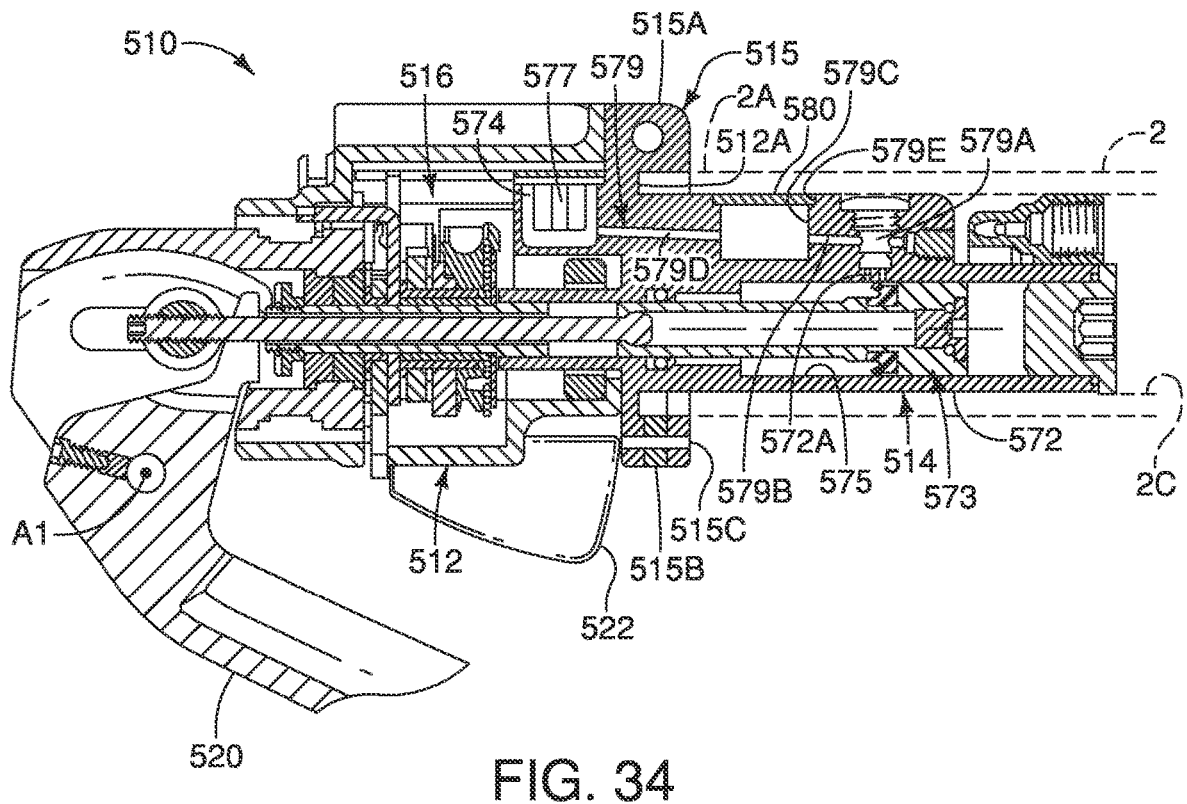
FIG. 34 is a center longitudinal cross sectional view, similar to FIGS. 23, 32 and 33, of a right bar-end type bicycle hydraulic operating device in accordance with a sixth embodiment in which a reservoir is outside of the handlebar and a hydraulic cylinder is at least partially disposed inside the handlebar in the state where a base member is mounted to the handlebar.

Referring now to FIG. 34, a right bicycle hydraulic operating device 510 is illustrated in accordance with a sixth embodiment. In view of the similarities between the third and sixth embodiments, the parts of the third and sixth embodiments that are identical will not be described again with respect to the sixth embodiment for the sake of brevity. Similar to the prior discussed embodiments, the bar-end type bicycle hydraulic operating device 510 includes both a braking function and a shifting function in a single unit that is mounted to the bicycle. In the sixth embodiment, the bar-end type bicycle hydraulic operating device (hereinafter "operating device") 510 comprises a base member 512 and a hydraulic unit 514. Here, the base member 512 is configured to be mounted on a handlebar 2. In particular, the base member 512 includes an external handlebar fixing structure 515 that is configured to contact an external surface 2A of the handlebar 2. The external handlebar fixing structure 515 includes a first or fixed clamp portion 515A and a second or movable clamp portion 515B. A first end of the movable clamp portion 515B is pivotally attached to a first end of the fixed clamp portion 515A by a pivot pin 515C. A fastener such as a bolt connects second ends of the clamp portions 515A and 515B to vary the size of the handlebar receiving opening. The base member 512 has an abutment 512A that is configured to contact an end of the handlebar 2. The hydraulic unit 514 is provided on the base member 512. In the sixth embodiment, the hydraulic unit 514 is partially disposed inside the handlebar 2 in the state where the base member 512 is mounted to the handlebar 2 as explained below. Similar to the third embodiment, the hydraulic unit 514 is operatively coupled to the hydraulic brake device (not shown) via the hydraulic hose H. In the sixth embodiment, the hydraulic unit 514 is partially disposed inside the handlebar 2 as explained below.

In the sixth embodiment, the operating device 510 further comprises a shift unit 516, which is identical to the shift unit 216 of the third embodiment. In the sixth embodiment, the operating device 510 further includes a first operating member 520 and a second operating member 522. The first and second operating members 520 and 522 are used to operate the shift unit 516 in the same manner as the third embodiment as discussed above. The first operating member 520 is also used to operate the hydraulic unit 514 in the same manner as the third embodiment as discussed above. Also the first and second operating members 520 and 522 are trigger levers that are biased to their rest positions such that they automatically return to their rest position upon being released from an operated position in the same manner as the third embodiment as discussed above.

Now, the configuration of the hydraulic unit 514 will be discussed. Here, the hydraulic unit 514 is integrally formed with the external handlebar fixing structure 515, Similar to the prior embodiments, the hydraulic unit 514 includes a hydraulic cylinder 572, a piston 573 and a reservoir 574. The hydraulic cylinder 572 has a cylinder bore 575. The piston 573 is movably disposed in the cylinder bore 575. Preferably, the reservoir 574 is provided with a flexible diaphragm 577. The hydraulic cylinder 572 extends through the handlebar receiving opening. Thus, the hydraulic cylinder 572 is at least partially disposed inside the handlebar 2 in the state where the base member 512 is mounted to the handlebar 2. The hydraulic unit 514 is basically the same as the hydraulic unit 314, as discussed above, except that the configuration of the reservoir 574 has been modified. Thus, in this sixth embodiment, the reservoir 574 is disposed outside the handlebar 2 in the state where the base member 512 is mounted to the handlebar 2. Also with this configuration of the reservoir 574, the base member 512 includes a fluid passage 579 connecting the cylinder bore 575 and the reservoir 571. The fluid passage 579 has a connecting portion 579A contiguous with a port 572A of the hydraulic cylinder 572. The connecting portion 579A extends in a direction transverse to a fluid flow direction between the cylinder bore 575 and the reservoir 574.

Also with this configuration of the reservoir 574, the fluid passage 579 includes a first passage portion 579B, a second passage portion 579C and a third passage portion 579D. The second passage portion 579C has an opening 579E. The second passage portion 579C is disposed between the first and third passage portions 579B and 579D. The base member 512 has a cover 580 that is configured to cover the opening 579E of the second passage portion 579C. The second passage portion 579C has a larger cross sectional dimension than the first passage portion 579B in a direction transverse to a fluid flow direction between the cylinder bore 575 and the reservoir 574. By providing the second passage portion 579C and the cover 580, the fluid passage 579 can be more easily formed in the base member 512.

Figure 35:
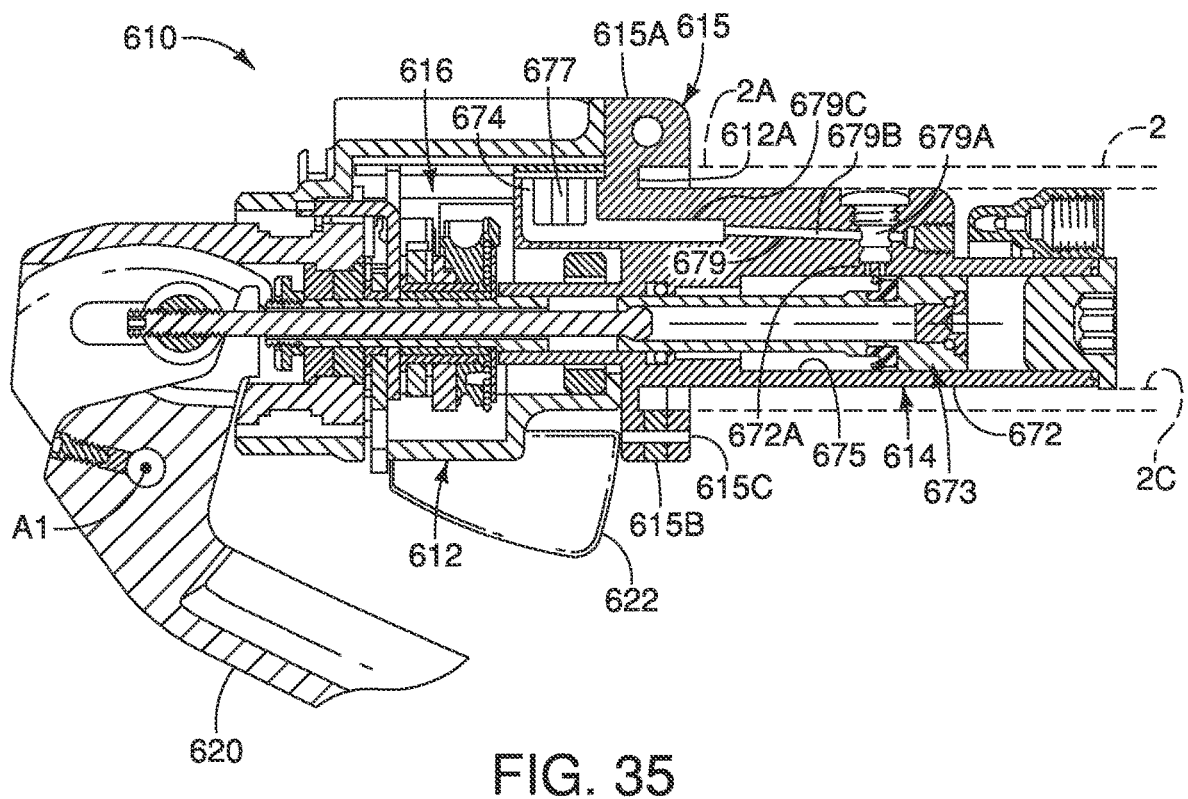
FIG. 35 is a center longitudinal cross sectional view, similar to FIGS. 23, 32, 33 and 34, of a right bar-end type bicycle hydraulic operating device in accordance with a seventh embodiment in which a reservoir and a hydraulic cylinder are at least partially disposed inside the handlebar in the state where a base member is mounted to the handlebar.

Referring now to FIG. 35, a right bicycle hydraulic operating device 610 is illustrated in accordance with a seventh embodiment. In view of the similarities between the third and seventh embodiments, the parts of the third and seventh embodiments that are identical will not be described again with respect to the seventh embodiment for the sake of brevity. Similar to the prior discussed embodiments, the bar-end type bicycle hydraulic operating device 610 includes both a braking function and a shifting function in a single unit that is mounted to the bicycle. In the seventh embodiment, the bar-end type bicycle hydraulic operating device (hereinafter "operating device") 610 comprises a base member 612 and a hydraulic unit 614. Here, the base member 612 is configured to be mounted on a handlebar 2. In particular, the base member 612 includes an external handlebar fixing structure 615 that is configured to contact an external surface 2A of the handlebar 2. The external handlebar fixing structure 615 includes a first or fixed clamp portion 615A and a second or movable clamp portion 615B. A first end of the movable clamp portion 615B is pivotally attached to a first end of the fixed clamp portion 615A by a pivot pin 615C. A fastener such as a bolt connects second ends of the clamp portions 615A and 615B to vary the size of the handlebar receiving opening. The base member 612 has an abutment 612A that is configured to contact an end of the handlebar 2. The hydraulic unit 614 is provided on the base member 612. In the seventh embodiment, the hydraulic unit 614 is partially disposed inside the handlebar 2 in the state where the base member 612 is mounted to the handlebar 2 as explained below. Similar to the third embodiment, the hydraulic unit 614 is operatively coupled to the hydraulic brake device (not shown) via the hydraulic hose H. In the seventh embodiment, the hydraulic unit 614 is partially disposed inside the handlebar 2 as explained below.

In the seventh embodiment, the operating device 610 further comprises a shift unit 616, which is identical to the shift unit 216 of the third embodiment. In the seventh embodiment, the operating device 610 further includes a first operating member 620 and a second operating member 622. The first and second operating members 620 and 622 are used to operate the shift unit 616 in the same manner as the third embodiment as discussed above. The first operating member 620 is also used to operate the hydraulic unit 614 in the same manner as the third embodiment as discussed above. Also the first and second operating members 620 and 622 are trigger levers that are biased to their rest positions such that they automatically return to their rest position upon being released from an operated position in the same manner as the third embodiment as discussed above.

Now, the configuration of the hydraulic unit 614 will be discussed. Here, the hydraulic unit 614 is integrally formed with the external handlebar fixing structure 615, Similar to the prior embodiments, the hydraulic unit 614 includes a hydraulic cylinder 672, a piston 673 and a reservoir 674. The hydraulic cylinder 672 has a cylinder bore 675. The piston 673 is movably disposed in the cylinder bore 675. Preferably, the reservoir 674 is provided with a flexible diaphragm 677. The hydraulic cylinder 672 extends through the handlebar receiving opening, Thus, the hydraulic cylinder 672 is at least partially disposed inside the handlebar 2 in the state where the base member 612 is mounted to the handlebar 2. The hydraulic unit 614 is basically the same as the hydraulic unit 314, as discussed above, except that the configuration of the reservoir 674 has been modified. Thus, in this seventh embodiment, the reservoir 674 is disposed outside the handlebar 2 in the state where the base member 612 is mounted to the handle bar 2. Also with this configuration of the reservoir 674, the base member 612 includes a fluid passage 679 connecting the cylinder bore 675 and the reservoir 674. The fluid passage 679 has a connecting portion 679A contiguous with a port 672A of the hydraulic cylinder 672. The connecting portion 679A extends in a direction transverse to a fluid flow direction between the cylinder bore 675 and the reservoir 674.

Also with this configuration of the reservoir 674, the fluid passage 679 includes a first passage portion 679B and a second passage portion 679C. The second passage portion 679C has a larger cross sectional dimension than the first passage portion 679B in a direction transverse to a fluid flow direction between the cylinder bore 675 and the reservoir 674. By providing the second passage portion 679C, the fluid passage 679 can be more easily, formed in the base member 612.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bar-end type bicycle hydraulic operating device. Accordingly, these directional terms, as utilized to describe the bar-end type bicycle hydraulic operating device should be interpreted relative to a bicycle in an upright riding position on a horizontal surface and that is equipped with the bar-end type bicycle hydraulic operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bar-end bicycle hydraulic operating device comprising:
   a base member configured to be mounted on a radially outermost surface of a handlebar, the base member having an abutment configured to contact a free axial end of the handlebar; and
   a hydraulic unit provided on the base member, the hydraulic unit including a hydraulic cylinder having a cylinder bore, a piston movably disposed in the cylinder bore and a reservoir fluidly communicating with the cylinder bore,
   the reservoir including a reservoir tank and a diaphragm disposed in the reservoir tank, the diaphragm defining an air chamber and a fluid chamber in the reservoir tank, the fluid chamber being in fluid communication with the cylinder, the reservoir being integrally formed with the hydraulic cylinder.

2. The bar-end type bicycle hydraulic operating device according to claim 1, wherein
   the hydraulic cylinder is at least partially disposed inside the handlebar in the state where the base member is mounted to the handlebar.

3. The bar-end type bicycle hydraulic operating device according to claim 2, wherein
   the reservoir is disposed outside the handlebar in the state where the base member is mounted to the handlebar.

4. The bar-end type bicycle hydraulic operating device according to claim 3, wherein
   the base member includes an external handlebar fixing structure configured to contact an external surface of the handlebar.

5. The bar-end type bicycle hydraulic operating device according to claim 3, wherein
   the base member includes a fluid passage connecting the cylinder bore and the reservoir.

6. The bar-end type bicycle hydraulic operating device according to claim 5, wherein
   the base member has a recess provided between the cylinder bore and the reservoir, and a cover configured to cover the recess so as to define a space between the recess and the cover; and
   the fluid passage includes the space between the recess and the cover.

7. The bar-end type bicycle hydraulic operating device according to claim 5, wherein
   the fluid passage includes a first passage portion and a second passage portion, the second passage portion having a larger cross sectional dimension than the first passage portion in a direction transverse to a fluid flow direction between the cylinder bore and the reservoir.

8. The bar-end type bicycle hydraulic operating device according to claim 7, wherein
   the fluid passage further includes a third passage portion;
   the second passage portion has an opening, and the second passage portion is disposed between the first and third passage portions; and
   the base member has a cover configured to cover the opening of the second passage portion.

9. The bar-end type bicycle hydraulic operating device according to claim 5, wherein
   the fluid passage has a connecting portion contiguous with a port of the hydraulic cylinder, the connecting portion extending in a direction transverse to a fluid flow direction between the cylinder bore and the reservoir.

10. The bar-end type bicycle hydraulic operating device according to claim 2, wherein
    the reservoir is at least partially disposed inside the handlebar in the state where the base member is mounted to the handlebar.

11. The bar-end type bicycle hydraulic operating device according to claim 10, wherein
    the base member includes an external handlebar fixing structure configured to contact an external surface of the handlebar.

12. The bar-end type bicycle hydraulic operating device according to claim 1, wherein
    the hydraulic cylinder is disposed outside the handlebar in the state where the base member is mounted to the handlebar.

13. The bar-end type bicycle hydraulic operating device according to claim 12, wherein
    the reservoir is disposed outside the handlebar in the state where the base member is mounted to the handlebar.

14. The bar-end type bicycle hydraulic operating device according to claim 12, wherein
    the reservoir is at least partially disposed inside the handlebar in the state where the base member is mounted to the handlebar.

15. The bar-end type bicycle hydraulic operating device according to claim 1, further comprising
    an operating member configured to operate the hydraulic unit, and
    an additional unit provided on one of the base member and the operating member.

16. The bar-end type bicycle hydraulic operating device according to claim 15, wherein
    the additional unit is configured to operate a control cable.

17. The bar-end type bicycle hydraulic operating device according to claim 16, wherein
    the additional unit is mounted on the base member.

18. The bar-end type bicycle hydraulic operating device according to claim 15, wherein
the additional unit includes an electric switch.

19. The bar-end type bicycle hydraulic operating device according to claim 18, wherein
the electric switch is mounted on the operating member.

* * * * *